US009691251B2

(12) United States Patent
Yamaoka

(10) Patent No.: US 9,691,251 B2
(45) Date of Patent: Jun. 27, 2017

(54) LOST CHILD SEARCH SYSTEM, RECORDING MEDIUM, AND LOST CHILD SEARCH METHOD

(71) Applicant: MegaChips Corporation, Osaka-shi (JP)

(72) Inventor: Takio Yamaoka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 79 days.

(21) Appl. No.: 14/857,482

(22) Filed: Sep. 17, 2015

(65) Prior Publication Data

US 2016/0005287 A1   Jan. 7, 2016

Related U.S. Application Data

(63) Continuation of application No. PCT/JP2014/058443, filed on Mar. 26, 2014.

(30) Foreign Application Priority Data

Mar. 27, 2013 (JP) .................................. 2013-067693

(51) Int. Cl.
    G08B 1/08       (2006.01)
    G08B 21/02      (2006.01)
    (Continued)

(52) U.S. Cl.
    CPC ..... G08B 21/0272 (2013.01); G08B 21/0247 (2013.01); G08B 21/0255 (2013.01); H04W 4/008 (2013.01); H04W 4/023 (2013.01)

(58) Field of Classification Search
    CPC ............ G08B 21/0272; G08B 13/1427; G08B 21/0227; G08B 21/0247; H04W 4/008; H04W 4/023; H04W 4/027
    (Continued)

(56) References Cited

U.S. PATENT DOCUMENTS 6,317,049 B1 * 11/2001 Toubia ...................... G01S 5/10
                                                          340/539.1
7,843,327 B1 * 11/2010 DiMartino ......... G08B 13/1409
                                                          340/505
(Continued)

FOREIGN PATENT DOCUMENTS

CN       101739792 A     6/2010
CN       101739792 B     6/2010
(Continued)

OTHER PUBLICATIONS

Combined Chinese Office Action and Search Report issued Aug. 12, 2016 in Patent Application No. 201480010457.9 (with partial English language translation and English translation of category of cited documents).

(Continued)

*Primary Examiner* — Toan N Pham

(74) *Attorney, Agent, or Firm* — Oblon, McClelland, Maier & Neustadt, L.L.P.

(57) ABSTRACT

In a lost child search system including a parent terminal and a child terminal, the child terminal is provided with: a gyro sensor that measures the angular velocity for identifying the posture of that child terminal; an acceleration sensor that measures the acceleration of that child terminal; a positioning control unit that performs relative positioning of that child terminal based on the identified posture and the measured acceleration; a communication unit that performs data communication via near-field wireless communication using radio waves; an intensity detection unit that detects the radio wave intensity in the near-field wireless communication with the parent terminal; and an intensity decision unit that decides whether or not search for the child terminal is necessary in accordance with the detected intensity information. The acceleration sensor is made to start measuring (Continued)

the acceleration in accordance with the decision result (decision information) by the intensity decision unit.

11 Claims, 12 Drawing Sheets

(51) Int. Cl.
*H04W 4/00* (2009.01)
*H04W 4/02* (2009.01)

(58) Field of Classification Search
USPC ............... 340/539.13, 539.15, 539.11, 573.1
See application file for complete search history.

(56) References Cited

U.S. PATENT DOCUMENTS

| | | | | |
|---|---|---|---|---|
| 9,002,372 B2* | 4/2015 | Shakespeare | ......... | H04W 64/00 |
| | | | | 340/539.13 |
| 9,571,974 B2* | 2/2017 | Choi | ..................... | H04W 4/023 |
| 2005/0068169 A1* | 3/2005 | Copley | .............. | G08B 21/0283 |
| | | | | 340/539.13 |

FOREIGN PATENT DOCUMENTS

| | | | |
|---|---|---|---|
| CN | 102103784 | A | 6/2011 |
| CN | 202143208 | U | 2/2012 |
| JP | 2001-044925 | A | 2/2001 |
| JP | 2004-003884 | A | 1/2004 |
| JP | 2006-039709 | A | 2/2006 |
| JP | 2007-279837 | | 10/2007 |
| JP | 2007-299127 | A | 11/2007 |
| JP | 2007-312165 | A | 11/2007 |
| JP | 2009-014646 | A | 1/2009 |
| JP | 2012-145457 | A | 8/2012 |
| JP | 2013-019839 | A | 1/2013 |

OTHER PUBLICATIONS

International Preliminary Report of Patentability and Written Opinion issued Sep. 29, 2015 in PCT/JP2014/058443 (with English translation).
International Search Report issued Jun. 24, 2014 in PCT/JP2014/058443 filed Mar. 26, 2014 with English translation.
Office Action issued Mar. 7, 2017 in Chinese Patent Application No. 201480010457.9 (with English translation).
Office Action issued in Japanese Application No. 2013-067693 on Apr. 18, 2017.

* cited by examiner

US 9,691,251 B2

LOST CHILD SEARCH SYSTEM, RECORDING MEDIUM, AND LOST CHILD SEARCH METHOD

TECHNICAL FIELD

The present invention relates to a technique for searching an object that got lost in a facility such as an amusement park or a complex of shops.

BACKGROUND ART

Conventionally, a technique has been proposed which identifies the position of an object that got lost (hereinafter, referred to as a "search object") by adopting RFID (Radio Frequency IDentification). For example, Patent Literature 1 describes a technique which reads an RF tag with a reader, performs radar capturing, and identifies the position of an object with the RF tag attached thereto, thereby searching the search object.

Further, as a technique for identifying the position of a moving object, a technique using a GPS (Global Positioning System) is known. Furthermore, PDR (Pedestrian Dead Reckoning) is known as a technique that can identify the position of a moving body even in an environment where receiving a GPS signal is difficult, for example, in doors. Patent Literature 2 describes a technique that identifies the position of a pedestrian by using the PDR technique, for example. Therefore, it can be considered to make the search object carry a portable terminal device having a PDR function therewith so that the position of the search object is transmitted to a monitor device for the search object.

Patent Literature 1: Japanese Patent Application Laid-open No. 2009-014646

Patent Literature 2: Japanese Patent Application Laid-open No. 2012-145457

SUMMARY OF INVENTION

Problems to be Solved by the Invention

However, the technique described in Patent Literature 1 has a problem that in a case where the reader cannot read the RF tag it is not possible to identify the position of the search object and it is therefore necessary to install the reader to fully cover an area for which the search is performed (that is, not to form a dead angle). In other words, the technique of Patent Literature 1 has a problem of increase in the cost caused by increase in the number of readers, and also has another problem that the area of search is limited by the positions and the number of the installed readers.

In the technique described in Patent Literature 2, it is necessary to continue to estimate the position even when the search is not required (i.e., when the object has not got lost yet), thus leading to a problem that, in the portable terminal device for which power situation is not good, the power consumption increases.

Means for Solving the Problems

In order to solve the aforementioned problems, according to the invention of claim 1, a lost child search system includes two or more portable terminal devices. Each of the two or more portable terminal devices includes: a posture identification element that identifies a posture of its own device; an acceleration sensor that measures an acceleration of its own device, and a positioning element that performs relative positioning of its own device based on the posture identified by the posture identification element and the acceleration measured by the acceleration sensor. The lost child search system also includes: a communication element that performs data communication via near-field wireless communication using radio waves between one of the two or more portable terminal devices and another one of the two or more portable terminal devices different from the one portable terminal device; an intensity detection element that detects a radio wave intensity in the near-field wireless communication between the one portable terminal device and the other portable terminal device; a decision element that decides, in accordance with the radio wave intensity detected by the intensity detection element, whether or not search for the other portable terminal device performing the near-field wireless communication at the detected radio wave intensity is required; a relative position calculation element that obtains a relative positional relationship between the one portable terminal device and the other portable terminal device based on a positioning result by the positioning element of the one portable terminal device and a positioning result by the positioning element of the other portable terminal device for which it has been decided that the search is necessary by the decision element; an information creation element that creates search information based on the positional relationship obtained by the relative position calculation element; and a search information output element that outputs the search information created by the information creation element. Each of the two or more portable terminal devices further includes a control element that makes the acceleration sensor of its own device start measuring the acceleration in accordance with the decision result by the decision element.

The invention according to claim 2 is the lost child search system according to claim 1 wherein a correction element is further included that calculates a correction value for the positional relationship obtained by the relative position calculation element in accordance with the radio wave intensity detected by the intensity detection element, and the information creation unit creates the search information based on the correction value obtained by the correction element, The invention according to claim 3 is the lost child search system according to claim 1 wherein the decision element decides whether or not the search is necessary by comparing a difference between a radio wave intensity at an initial state and a radio wave intensity at a time of the measurement with a threshold value.

The invention according to claim 4 is the lost child search system according to claim 1 wherein the posture identification element includes a magnetic sensor for detecting geomagnetism, and the control element makes the posture identification element of its own device start measuring an angular velocity in accordance with the decision result by the decision element.

The invention according to claim 5 is the lost child search system according to claim 1 wherein the search information output element outputs the decision result by the decision element.

The invention according to claim 6 is the lost child search system according to claim 1 wherein the other portable terminal device further includes: a motion detection element that detects a motion equal to or larger than a threshold value based on the acceleration measured by the acceleration sensor of its own device, after it is decided that the search for its own device is necessary by the decision element; and a warning output element that outputs a warning in response to detection of the motion equal to or larger than the threshold value by the motion detection element.

The invention according to claim 7 is the lost child search system according to claim 6 wherein the motion detection element decides whether or not the detected motion equal to or larger than the threshold value is a motion towards the one portable terminal device, and the warning output element outputs the warning in accordance with the decision result by the motion detection unit.

The invention according to claim 8 is the lost child search system according to claim 1 wherein the information creation element creates the search information in accordance with the detection result by the intensity detection element.

The invention of claim 9 is a non-transitory computer-readable storage medium storing computer-readable instructions that, when executed by a computer connected to an external portable terminal device, cause the computer to perform a lost child search method. The method includes the steps of; transmitting a test signal via near-field wireless communication using radio waves to the external portable terminal device; receiving a result of decision whether or not search for the external portable terminal device is necessary in accordance with a radio wave intensity of the test signal, and a result of relative positioning of the external portable terminal device from the external portable terminal device; identifying a posture of the computer; measuring an acceleration of the computer by an acceleration sensor in accordance with the received decision result; performing relative positioning of the computer in accordance with the identified posture of the computer and the acceleration of the computer measured by the acceleration sensor; obtaining a relative positional relationship between the computer and the external portable terminal device based on the result of the relative positioning of the computer and the received result of the relative positioning of the external portable terminal device; creating search information based on the obtained positional relationship; and outputting the created search information.

The invention of claim 10 is a non-transitory computer-readable storage medium storing computer-readable instructions that, when executed by a computer connected to an external portable terminal device, cause the computer to perform a lost child search method. The method includes the steps of; receiving a test signal transmitted from the external portable terminal device via near-field wireless communication using radio waves; detecting a radio wave intensity when the test signal has been received; deciding whether or not search for the computer is necessary in accordance with the detected radio wave intensity; identifying a posture of the computer; measuring an acceleration of the computer by an acceleration sensor in accordance with the decision result; performing relative positioning of the computer in accordance with the identified posture of the computer and the acceleration of the computer measured by the acceleration sensor; and transmitting a result of the relative positioning to the external portable terminal device.

The invention of claim 11 is a lost child search method that includes the steps of; transmitting a test signal via near-field wireless communication using radio waves from one portable terminal device to another portable terminal device different from the one portable terminal device; detecting a radio wave intensity when the test signal has been received in the other portable terminal device; deciding whether or not search for the other portable terminal device is necessary in accordance with the detected radio wave intensity; identifying a posture of the one portable terminal device; identifying a posture of the other portable terminal device; measuring an acceleration of the one portable terminal device after the search for the other portable terminal device is decided as being necessary; measuring an acceleration of the other portable terminal device after the search for the other portable terminal device is decided as being necessary; obtaining a relative position of the one portable terminal device in accordance with the identified posture of the one portable terminal device and the measured acceleration of the one portable terminal device; obtaining a relative position of the other portable terminal device in accordance with the identified posture of the other portable terminal device and the measured acceleration of the other portable terminal device; obtaining a relative positional relationship between the one portable terminal device and the other portable terminal device in accordance with the relative position of the one portable terminal device and the relative position of the other portable terminal device; creating search information based on the relative positional relationship; and outputting the created search information.

Advantageous Effects of Invention

According to the inventions according to claims 1 to 11, the radio wave intensity in near-field wireless communication is detected, it is decided in accordance with the detected radio wave intensity whether or not the search is necessary, and the acceleration sensor is made to start measurement of the acceleration. Thus, it is possible to enable the search for a lost child only by making the searcher and the search object carry portable terminal devices, respectively. Also, since the measurement of the acceleration and positioning processing are performed only when the search is required, the power consumption in the portable terminal devices can be suppressed as compared with a conventional technique in which the measurement and the positioning process are always performed.

DESCRIPTION OF REFERENCE SIGNS

Figure 1:
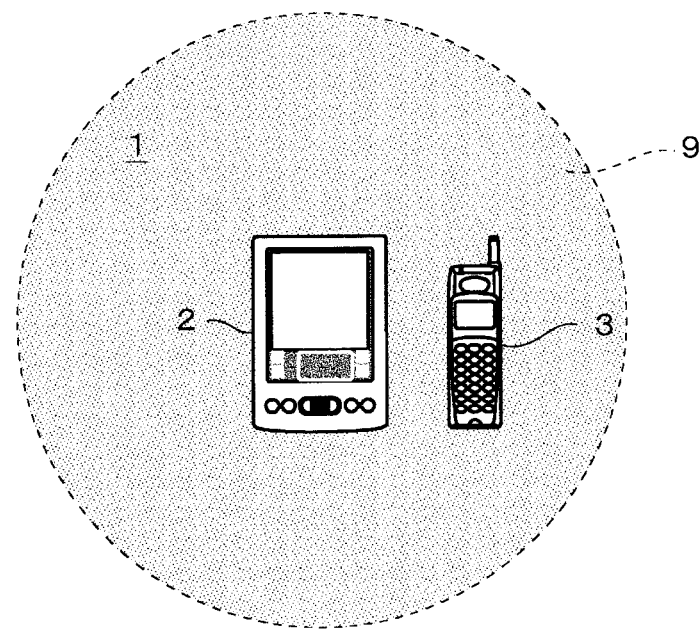
FIG. 1 illustrates a lost child search system.

1 Lost child search system
2 Parent terminal 20, 30 CPU
200, 300 Communication control unit
201, 304 Positioning control unit
202 Relative position calculation unit
203 Correction unit
204, 303 Information creation unit
21, 31 Storage device
210, 310 Program
211, 314 Positioning information
212 Relative position information
213 Correction information
214, 315 Search information
22, 32 Operation unit
23, 33 Display unit
24, 34 Speaker
25, 35 Gyro sensor
250, 350 Angular velocity information
26, 36 Acceleration sensor
260, 360 Acceleration information
27, 37 Communication unit
3 Child terminal
301 Intensity detection unit
302 Intensity decision unit
305 Motion detection unit
311 Intensity information
312 Decision information
313 Child terminal information
37 Communication unit
9, 90, 91, 92, 93 Not-yet-searched area
a, F Threshold value
Fs, Fs0 Radio wave intensity

DESCRIPTION OF EMBODIMENTS

A preferred embodiment of the present invention is described in detail below, with reference to the accompanying drawings. In the following description, descriptions related to directions and orientations are intended to correspond to those in the drawings for convenience of the description and are not intended to limit products for which the invention is put into practice, manufactured products, the scope of the patent right, or the like, unless otherwise specified.

The present application claims a priority from Japanese Patent Application No. 2013-067693 filed in Japan on Mar. 27, 2013, the contents of which are incorporated herein by reference.

FIG. 1 is a diagram illustrating a lost child search system 1. The lost child search system 1 includes a parent terminal 2 and a child terminal 3. Please note that both the parent terminal 2 and child terminal 3 are configured as terminal devices that can be carried (portable terminal devices). The number of the parent terminals 2 and that of the child terminals 3 are not limited to those shown in FIG. 1. For example, there may be two child terminals 3 for one parent terminal 2. Please note that a region surrounded by a circle in broken line (hatched region) in FIG. 1 conceptually represents a not-yet-searched area 9 that is determined mainly in accordance with the position of the parent terminal 2 (the details will be described later).

In the following description, a person who carries the parent terminal 2 therewith is referred to as a "searcher" and a person who carries the child terminal 3 is referred to as a "search object." That is, it is assumed that, in case the search object got lost, a person who supervises and monitors the search object carries the parent terminal 2 as a searcher and the search object is made to carry the child terminal 3. However, the "searcher" and the "search object" are names defined for convenience of the description, and are not intended to limit the actions of these persons. For example, the searcher may carry and operate the child terminal 3 temporarily. In addition, the search object is not limited to a human, but may be a moving body such as a pet.

Figure 2:
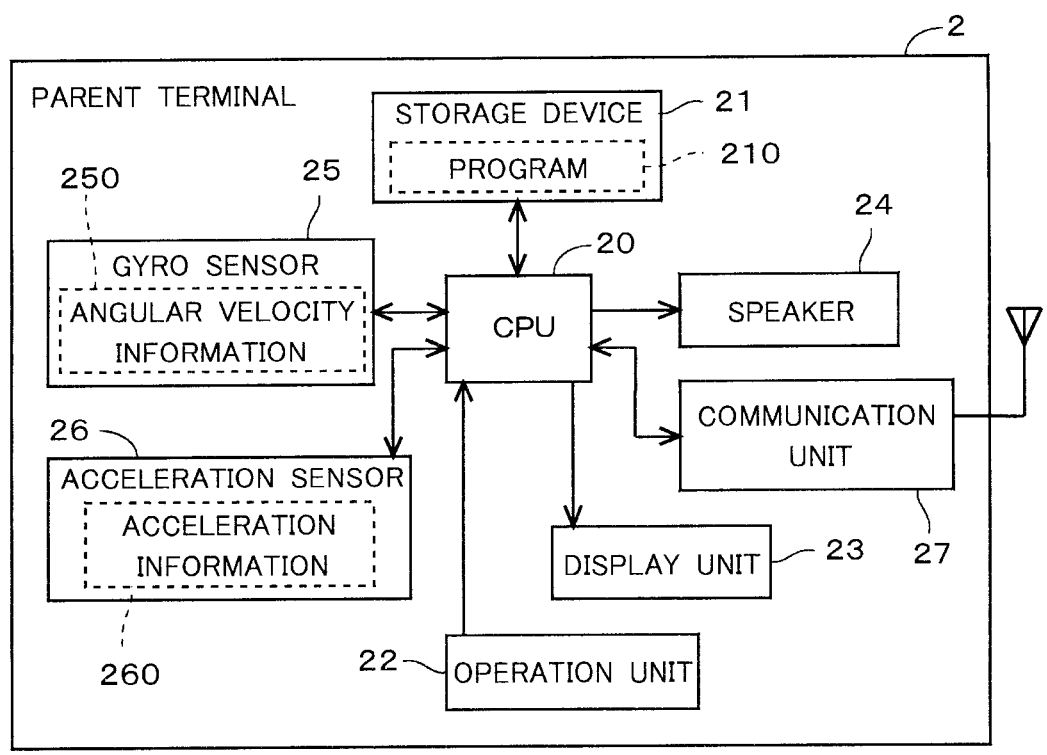
FIG. 2 is a block diagram of a parent terminal.

FIG. 2 is a block diagram of the parent terminal 2. The parent terminal 2 includes a CPU 20, a storage device 21, an operation unit 22, a display unit 23, and a speaker 24, and is configured as a typical computer that can be carried by the searcher. That is, the parent terminal 2 forms one of two or more portable terminal devices in the lost child search system 1.

The CPU 20 executes a program 210 stored in the storage device 21 while reading it, thereby performing calculation of various types of data, creation of control signals, and the like. Thus, the CPU 20 has a function of controlling the respective components of the parent terminal 2 and calculating and creating various types of data.

The storage device 21 provides a function of storing various types of data in the parent terminal 2. In other words, the storage device 21 stores electronically fixed information in the parent terminal 2. In particular, the storage device 21 in the preferred embodiment is used for storing the program 210.

As the storage device 21, a RAM and a buffer used as a temporary working area of the CPU 20, a read-only ROM, a non-volatile memory (e.g., a NAND memory), a hard disk for storing a relatively large amount of data, and a portable storage medium mounted onto a dedicated reader device (e.g., a PC card, an SD card, and a USB memory) can be used, for example. FIG. 2 shows the storage device 21 as if it was a single structure. However, the storage device 21 is usually formed by a plurality of types of devices among the above exemplified various types of devices (or medium), which are employed as necessary. That is, the storage device 21 is a collective term of the devices having the function of storing data.

The CPU 20 is actually an electronic circuit including therein a RAM that allows a high speed access thereto. Such a memory device included in the CPU 20 is also described as being included in the storage device 21, for convenience of the description. That is, in the preferred embodiment, the data temporarily stored in the CPU 20 itself is described as being also stored in the storage device 21.

The operation unit 22 is hardware operable by the searcher when the searcher inputs various types of information to the parent terminal 2. As the operation unit 22, various types of buttons, keys, a rotary selector, a touch panel, or the like is applicable. In particular, the operation unit 22 in the preferred embodiment is operated when an operation by the lost child search system 1 is started and when the searcher lost sight of the search object and forcibly issues an instruction to start the search, for example. In the following description, a signal input in the former case is referred to as an "operation start signal" and a signal input in the latter case is referred to as a "search start instruction signal".

The display unit 23 has a function as an output unit that outputs various types of information by displaying it. That is, the display unit 23 is hardware that outputs information in a state in which the information can be visually perceived by the searcher. As a device forming the display unit 23, a liquid crystal panel, a liquid crystal display, an organic EL display, a lamp, or, an LED is applicable, for example. However, these are merely examples and the device forming the display unit 23 is not limited to these devices. Also, it is not necessary for the parent terminal 2 to include all of the devices exemplified above.

The Speaker 24 has a function as an output unit that reproduces various types of information as sounds, thereby outputting the information. That is, the speaker 24 is hardware that outputs the information in a state in which the searcher can perceive the information by hearing.

The parent terminal 2 further includes a gyro sensor 25, an acceleration sensor 26, and communication unit 27, as shown in FIG. 2.

The gyro sensor 25 measures an angular velocity in the movement of the parent terminal 2, thereby acquire angular velocity information 250. The gyro sensor 25 in the preferred embodiment is configured as a so-called triaxial gyro sensor and measures angular velocities around mutually perpendicular three axial directions.

The acceleration sensor 26 measures an acceleration in the movement of the parent terminal 2 to acquire acceleration information 260. The acceleration sensor 26 in the preferred embodiment is configured as a so-called triaxial acceleration sensor and can measure accelerations of the parent terminal 2 with respect to mutually perpendicular three axial directions.

The communication unit 27 has a function of performing data communication by near-field wireless communication using radio waves with the child terminal 3. Please note that the parent terminal 2 in the preferred embodiment is configured as a so-called smartphone and the communication unit 27 also has a function of connecting to a mobile telephone network (wide-area wireless communication network).

Figure 3:
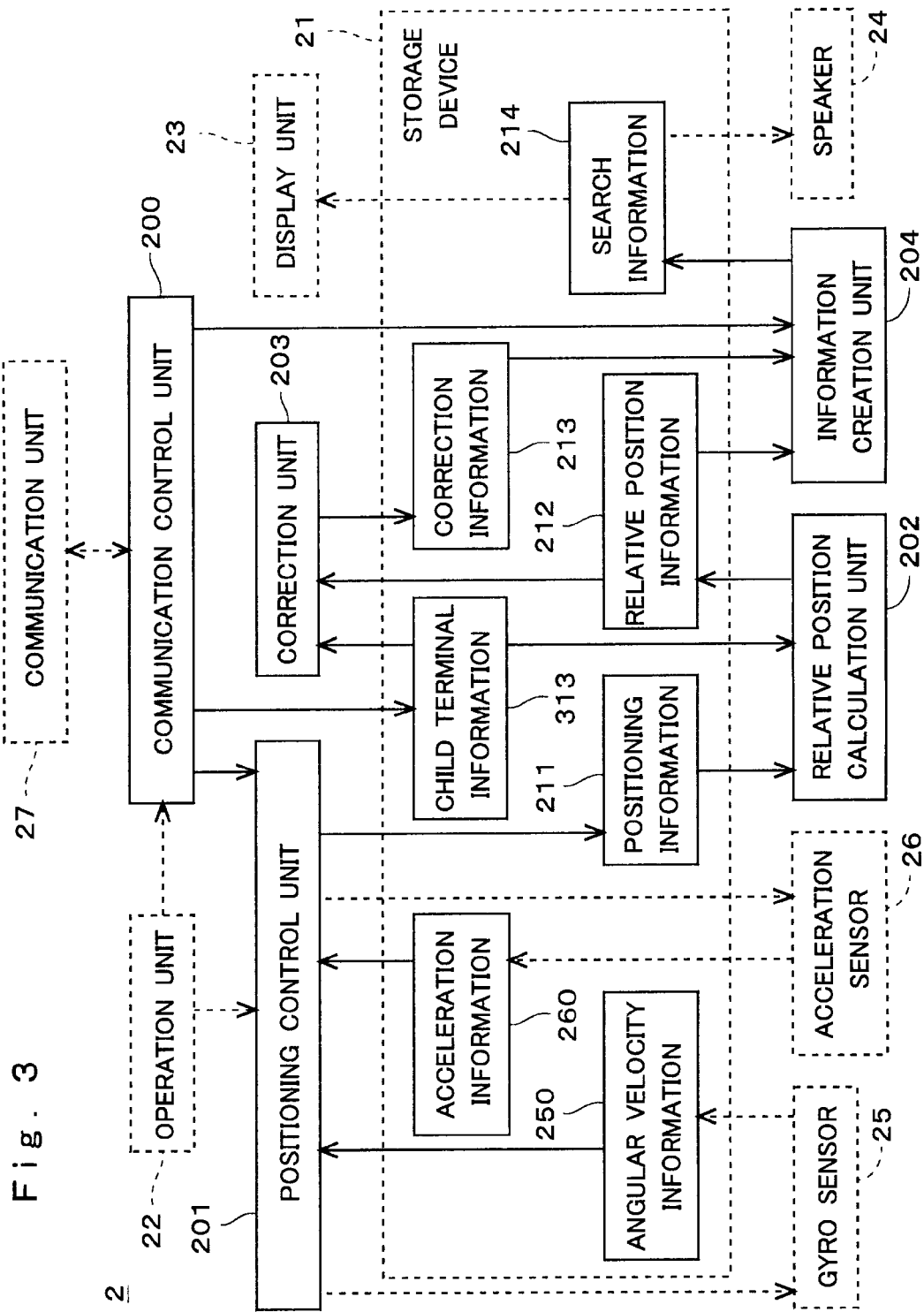
FIG. 3 illustrates functional blocks provided in the parent terminal, together with a data flow.

FIG. 3 is a diagram showing functional blocks provided in the parent terminal 2, together with a data flow. A communication control unit 200, a positioning control unit 201, a relative position calculation unit 202, a correction unit 203, and an information creation unit 204 that are shown in FIG. 3 are functional blocks achieved by an operation of the CPU 20 in accordance with the program 210.

The communication control unit 200 achieves transmission and reception of data using near-field wireless communication with the child terminal 3 by controlling the communication unit 27. That is, the communication control unit 200 has a function of, in accordance with information that the communication unit 27 has received from the child terminal 3, storing that information in the storage device 21 and transmitting it to another functional block. In addition, the communication control unit 200 controls the communication unit 27 in response to a signal or information transmitted from another component, so that the communication unit 27 transmits various types of information to the child terminal 3.

More specifically, the communication control unit 200 controls the communication unit 27 to transmit a signal (hereinafter, referred to as a "test signal) to the child terminal 3 at a given timing, also during a time period in which the search object is not being searched. That is, when the operation start signal is transmitted from the operation unit 22, the communication control unit 200 controls the communication unit 27 to transmit the test signal and also transmit the test signal at a given timing thereafter. It is assumed that the parent terminal 2 in the preferred embodiment regularly transmits the test signal every predetermined period, and that period is referred to as "Tt". However, the above-described given timing need not be regular, but may be irregular.

When the communication unit 27 receives information for requesting start of the search (this is transmitted from the child terminal 3 and is referred to as "start request information"), the communication control unit 200 transmits the start request information to the positioning control unit 201 and the information creation unit 204. Although the details will be described later, the start request information transmitted from the child terminal 3 is information included in information received as child terminal information 313 in the preferred embodiment. That is, the communication control unit 200 analyzes the child terminal information 313 received by the communication unit 27, and, in a case where the start request information is included, transmits it to the positioning control unit 201 and the information creation unit 204.

After the communication unit 27 receives the start request information, the communication control unit 200 controls the communication unit 27 to transmit request information (information for requesting transmission of the child terminal information 313) to the child terminal 3 at a given timing (e.g., regularly). In the lost child search system 1 in the preferred embodiment, the child terminal 3 transmits the child terminal information 313 to the parent terminal 2 while the test signal transmitted from the parent terminal 2 after the start of the search is regarded as the request information, although the details will be described later. However, the parent terminal 2 may create the request information separately from the test signal and transmit it to the child terminal 3.

When the search start instruction signal from the operation unit 22 is transmitted, the communication control unit 200 controls the communication unit 27 to transmit the start request information to the child terminal 3. Thus, the start request information is transmitted from the parent terminal 2 to the child terminal 3 in some cases, and is transmitted from the child terminal 3 to the parent terminal 2 in other cases, as described before.

Further, when the communication unit 27 receives the child terminal information 313, the communication control unit 200 stores it in the storage device 21.

The positioning control unit 201 starts the gyro sensor 25 in response to the operation start signal transmitted from the operation unit 22. The positioning control unit 201 stores the posture of the parent terminal 2 when the gyro sensor 25 is started (hereinafter, this posture is referred to as a "parent terminal's initial posture") in the storage device 21. In the preferred embodiment, since relative positioning is sufficient as positioning in the parent terminal 2, it is not necessary that a posture with respect to an absolute azimuth is also known regarding the parent terminal's initial posture, although the details will be described later.

The positioning control unit 201 starts the acceleration sensor 26 in response to the search start instruction signal transmitted from the operation unit 22 or the start request information transmitted from the communication control unit 200. That is, the acceleration sensor 26 is not be started by the operation start signal. Therefore, since the acceleration sensor 26 is not started until the search start instruction signal or the start request information is created, the power consumption can be suppressed as compared with a conventional technique in which the acceleration sensor has to be always activated.

The positioning control unit 201 identifies the posture of the parent terminal 2 based on the angular velocity information 250 acquired by the gyro sensor 25. That is, the posture is identified in the parent terminal 2 by cooperation of the gyro sensor 25 and the positioning control unit 201.

Therefore, the gyro sensor 25 and the positioning control unit 201 correspond to a posture identification element in the parent terminal 2 in the preferred embodiment.

Further, the positioning control unit 201 performs relative positioning of its own terminal to create positioning information 211, based on the identified posture of the parent terminal 2 and the acceleration information 260 measured by the acceleration sensor 26. However, as described before, the acceleration sensor 26 is not started by the operation start signal. Therefore, before the acceleration sensor 26 is started (before it is decided that the search is necessary), the positioning control unit 201 does not perform relative positioning of its own terminal, nor creates the positioning information 211. That is, the parent terminal 2 in the preferred embodiment can suppress the power consumption, as compared with a case of always performing those calculations. As a method for obtaining the relative positional information (positioning information 211) based on the angular velocity information 250 and the acceleration information 260, a conventional technique is applicable as appropriate, and therefore the detailed description thereof is omitted.

The relative position calculation unit 202 obtains a relative positional relationship between the parent terminal 2 and the child terminal 3 based on the result of the positioning by the positioning control unit 201 (the positioning information 211) and the result of the positioning in the child terminal 3 included in the child terminal information 313, thereby creating relative position information 212.

The correction unit 203 calculates a correction value for the relative position information 212 by referring to the child terminal information 313, and creates correction information 213. More specifically, the correction unit 203 calculates the correction value for the positional relationship (relative position information 212) obtained by the relative position calculation unit 202 in accordance with a radio wave intensity (described later) shown in the child terminal information 313.

When the relative position information 212 and the correction information 213 are created, the information creation unit 204 creates search information 214 based on the relative position information 212 and the correction information 213. The search information 214 is information to be output to the display unit 23 and the speaker 24.

When reception of the start request information by the communication unit 27 is transmitted from the communication control unit 200, the information creation unit 204 creates the search information 214 indicating that fact. The search information 214 created at this time is information indicating that it has been decided in the child terminal 3 that it is necessary to start the search, and is output mainly with the speaker 24. Thus, the parent terminal 2 can inform the searcher that the search has been started, and the searcher can become aware that the search has been started even when the searcher is not gazing the display unit 23. In place of the sound of the speaker 24, notification may be performed with vibration of a vibrator.

Figure 4:
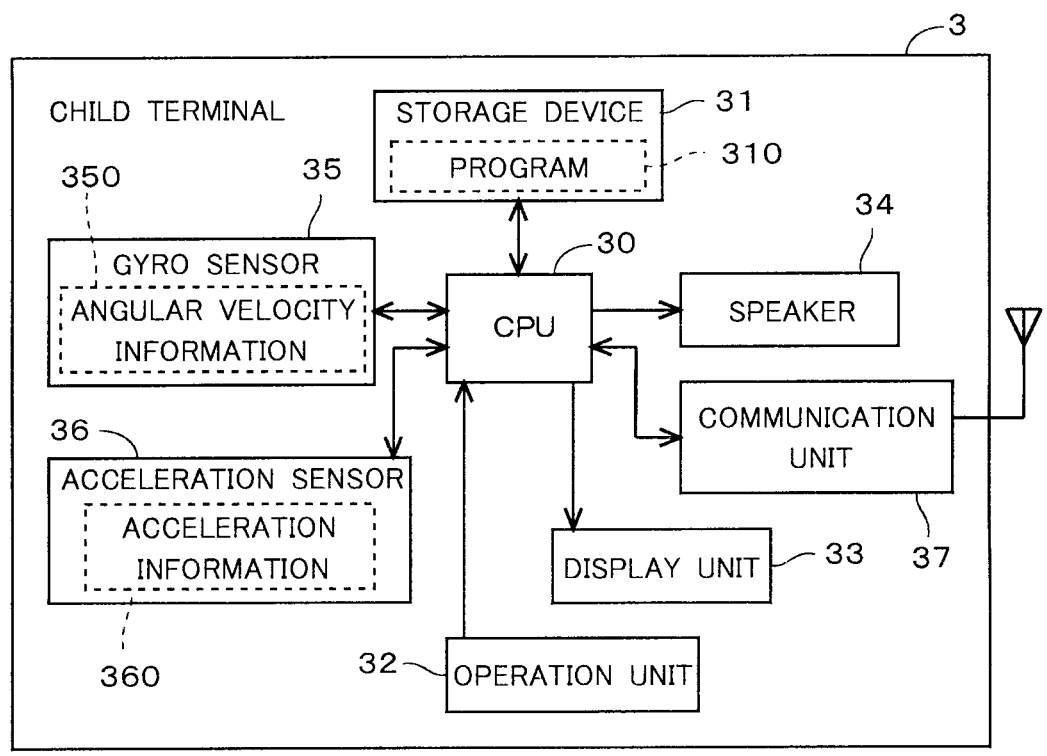
FIG. 4 is a block diagram of a child terminal.

FIG. 4 is a block diagram of the child terminal 3. The child terminal 3 includes a CPU 30, a storage device 31, an operation unit 32, a display 33, and a speaker 34, and is configured as a general computer that can be carried by the search object. That is, the child terminal 3 constitutes another one of two or more portable terminal devices in the lost child search system 1, other than the one of the portable terminal device (parent terminal 2).

The CPU 30 executes a program 310 stored in the storage device 31 while reading it, and performs calculation of various types of data, creation of control signals, and the like. Thus, the CPU 30 has a function of controlling each component of the child terminal 3 and calculating and creating various types of data.

The storage device 31 provides a function of storing various types of data in the child terminal 3. In other words, the storage device 31 stores electronically fixed information in the child terminal 3. In particular, the storage device 31 in the preferred embodiment is used for storing the program 310.

As the storage device 31, a RAM and a buffer used as a temporary work area of the CPU 30, a read-only ROM, a non-volatile memory (e.g., a NAND memory), a hard disk for storing a relatively large amount of data, and a portable storage medium mounted onto a dedicated reader device (e.g., a PC card, an SD card, and a USB memory) is applicable, for example. In FIG. 4, the storage device 31 is shown as if it was a single structure. However, the storage device 31 is usually formed by a plurality of types of devices employed among the above exemplified various types of devices (or medium) as necessary. That is, the storage device 31 is a collective term of the devices having the function of storing data.

The CPU 30 is actually an electronic circuit including therein a RAM allowing a high speed access thereto. However, for convenience of the description, such a storage device included in the CPU 30 is described as being included in the storage device 31. That is, in the preferred embodiment, it is described that data temporarily stored in the CPU 30 itself is also stored in the storage device 31.

The operation unit 32 is hardware that is operable by the search object for inputting various types of information to the child terminal 3. As a device constituting the operation unit 32, various types of buttons, keys, a rotary selector, or a touch panel is applicable, for example. However, these are merely examples and the device constituting the operation unit 32 is not limited thereto. Further, the child terminal 3 is not necessary to include all of the devices exemplified above. Since it is relatively highly likely that the search object is a person who is unfamiliar with the operation of the device (a child or an elderly person), it is desirable that the operation unit 32 can be simply operated.

The operation unit 32 in the preferred embodiment is operated for inputting the operation start signal, when the operation by the lost child search system 1 is started. The operation of inputting the operation start signal is an operation required when the search object has not got lost (search condition). Therefore, when input of the operation start signal is required, the search object is considered to be still together with the searcher, and therefore the searcher may be input the operation start signal in place of the search object relatively unfamiliar with the operation of the device.

The display unit 33 has a function as an output unit that outputs various types of information by displaying it. That is, the display unit 33 is hardware that outputs the information in a state in which the search object can visually perceive the information. As a device constituting the display unit 33, a liquid crystal panel, a liquid crystal display, an organic EL display, a lamp, or an LED is applicable, for example. However, these are merely examples and the device constituting the display unit 33 is not limited thereto. Moreover, the child terminal 3 is not necessary to include all of the devices exemplified above. The display unit 33 in the preferred embodiment can display search information 315 (see FIG. 5).

The speaker 34 has a function as an output unit that outputs the information by reproducing various types of information as a sound. That is, the speaker 34 is hardware that outputs the information in a state in which the search object can perceive information by hearing. In particular, the speaker 34 outputs a warning (search information 315) in response to detection of a motion equal to or larger than a threshold value in a direction in which the child terminal 3 moves away from (or does not get close to) the parent terminal 2 (details will be described later).

Furthermore, the child terminal 3 includes a gyro sensor 35, an acceleration sensor 36, and the communication unit 37, as shown in FIG. 4.

The gyro sensor 35 measures an angular velocity in the movement of the child terminal 3 to acquire angular velocity information 350. The gyro sensor 35 in the preferred embodiment is configured as a so-called triaxial gyro sensor like the gyro sensor 25.

The acceleration sensor 36 measures an acceleration in the movement of the child terminal 3 to acquire the acceleration information 360. The acceleration sensor 36 in the preferred embodiment is configured as a so-called triaxial acceleration sensor like the acceleration sensor 26.

The communication unit 37 has a function of performing data communication by near-field wireless communication using radio waves with the parent terminal 2. Please note that the child terminal 3 in the preferred embodiment is configured as a so-called mobile phone, and the communication unit 37 also has a function of connecting to a mobile telephone network (wide-area wireless communication network). However, the child terminal 3 may not have the function of connecting to the wide-area wireless communication network in consideration of the risk of loss, because it is considered that the child terminal 3 is carried by a child or the like therewith.

Figure 5:
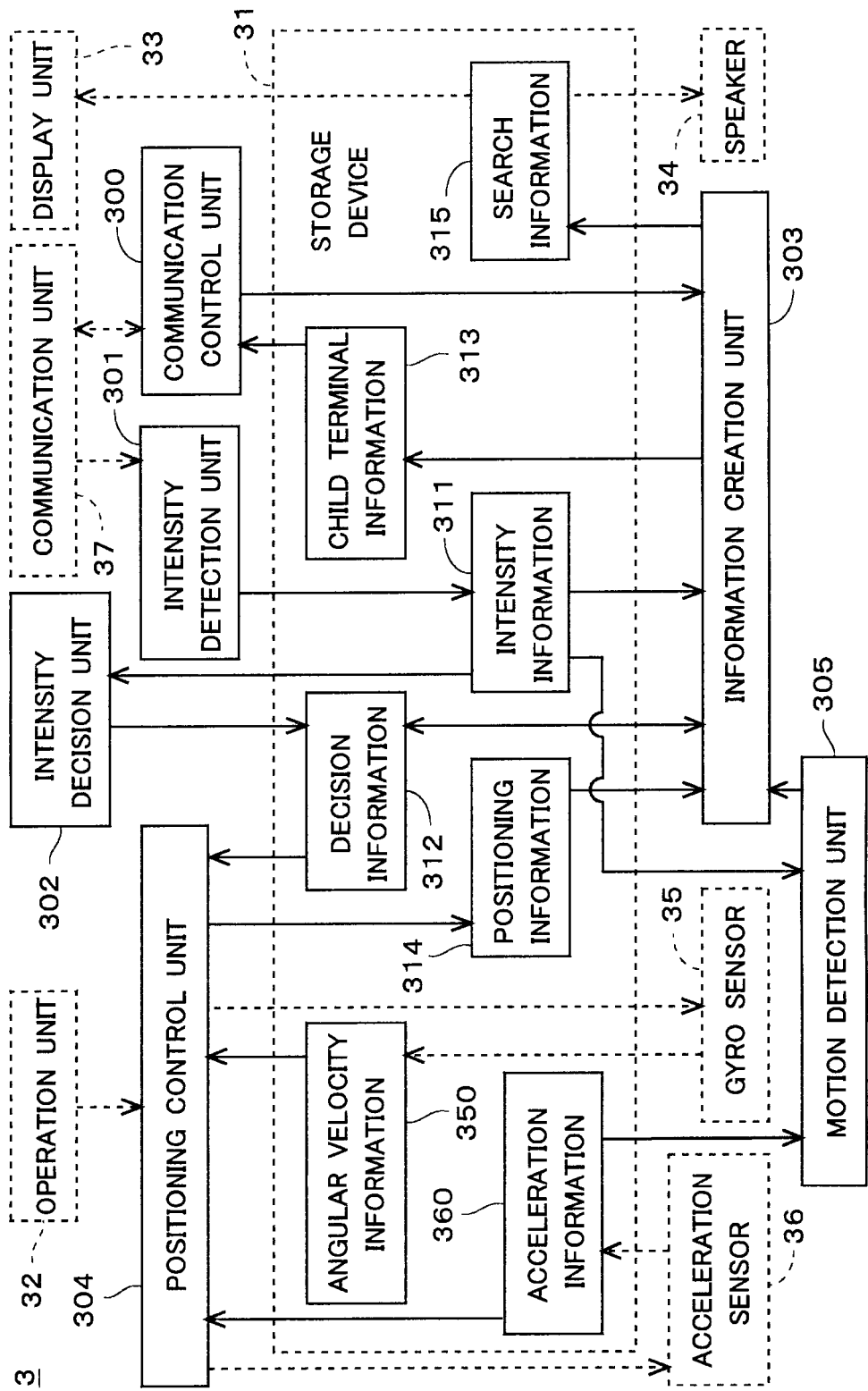
FIG. 5 illustrates functional blocks provided in the child terminal, together with a data flow.

FIG. 5 shows functional blocks provided in the child terminal 3, together with a data flow. A communication control unit 300, an intensity detection unit 301, an intensity decision unit 302, an information creation unit 303, a positioning control unit 304, and a motion detection unit 305 that are shown in FIG. 5 are functional blocks achieved by the operation of the CPU 30 in accordance with the program 310.

The communication control unit 300 achieves transmission and reception of data using near-field wireless communication with the parent terminal 2 by controlling the communication unit 37.

That is, the communication control unit 300 has a function of, in response to information the communication unit 37 received from the parent terminal 2, storing that information in the storage device 31 and transmitting that information to another functional block. For example, when the communication unit 37 has received the start request information or the request information, the communication control unit 300 transmits that fact to the information creation unit 303.

The communication control unit 300 also controls the communication unit 37 to transmit various types of information to the parent terminal 2 in response to the signal transmitted from another component or created information. For example, when the child terminal information 313 has been created, the communication control unit 300 controls the communication unit 37 to transmit the created child terminal information 313 to the parent terminal 2.

The intensity detection unit 301 detects the radio wave intensity in the near-field wireless communication by the communication unit 37 between the parent terminal 2 and the child terminal 3. More specifically, the intensity detection unit 301 detects the radio wave intensity of when the communication unit 37 receives the test signal (including the request information), and creates intensity information 311 indicating that radio wave intensity. The radio wave intensity detected by the intensity detection unit 301 is hereinafter referred to as a "radio wave intensity Fs". In particular, the radio wave intensity Fs detected by the intensity detection unit 301 for the first time (the radio wave intensity Fs in the initial state) is referred to as a "radio wave intensity Fs0".

The intensity decision unit 302 refers to the intensity information 311, compares the attenuation value of the radio wave intensity Fs with a preset threshold value (hereinafter, referred to as a "threshold value F") to decide whether or not the attenuation value is larger than the threshold value F, thereby creating decision information 312 indicating the decision result. It is assumed that the initial value of the decision information 312 in the preferred embodiment is "1" and is rewritten to "0" by the intensity decision unit 302 when F<Fs0−Fs is satisfied.

The not-yet-searched area 9 illustrated in FIG. 1 conceptually represents a region in which F=Fs0−Fs is established. In general, the radio wave intensity in near-field wireless communication is attenuated depending on the distance from a device transmitting the radio waves (the parent terminal 2 in the preferred embodiment). Therefore, it can be decided how far a device on the receiving side (the child terminal 3 in the preferred embodiment) is away from the device on the transmitting side by measuring the radio wave intensity in the device on the receiving side and comparing the radio wave intensity with the threshold value. That is, it is possible to decide that the position at which the attenuation value of the radio wave intensity Fs exceeds the threshold value F is outside the not-yet-searched area 9.

However, the actual not-yet-searched area 9 is not a circle as shown in FIG. 1. Instead, the position and the shape of the not-yet-searched area 9 can vary with time. For example, in a partial area where radio waves from the parent terminal 2 is shielded by a shield or the like, the radio wave intensity Fs is low even at a relatively short distance. However, when the child terminal 3 is located behind such a shield, it is highly likely that the searcher cannot visually recognize the search object even at a short distance. Therefore, it can be said that in such a case it is better to actively start the search even if the child terminal 3 is located near in terms of distance. That is, the lost child search system 1 decides whether or not the search is necessary, using the radio wave intensity Fs as an index. Thus, it is possible to properly decide the necessity of search, as compared with a case in which the necessity of search is decided simply based on the distance using a technique of a GPS, for example.

In the preferred embodiment, when F<Fs0−Fs is satisfied, it is decided that the child terminal 3 has exited from the not-yet-searched area 9 (the search object is away from the searcher and is solitary moving), and the intensity decision unit 302 decides that the search for that child terminal 3 (search object) is necessary. That is, the intensity decision unit 302 has a function of, in accordance with the radio wave intensity detected by the intensity detection unit 301 (intensity information 311), deciding whether or not the search for another portable terminal device (the child terminal 3 as its own terminal in the preferred embodiment) for which near-field wireless communication at that radio wave intensity is performed.

The information creation unit 303 has a function of creating necessary information, depending on circumstances. For example, the information creation unit 303 refers to the decision information 312. When the decision information 312 has been rewritten to "0" by the intensity decision unit 302, the information creation unit 303 creates the child terminal information 313 including the start request information. Also, every time it is transmitted from the communication control unit 300 that the communication control unit 300 has received the request information, the information creation unit 303 creates the child terminal information 313 including the intensity information 311 and positioning information 314. Further, the information creation unit 303 also has a function of creating search information 315 in accordance with the decision result of the motion detection unit 305 (described later).

The positioning control unit 304 starts the gyro sensor 35 in response to the operation start signal transmitted from the operation unit 32. The positioning control unit 304 stores the posture of the child terminal 3 when the gyro sensor 35 is started (hereinafter, referred to as a "child terminal's initial posture") in the storage device 31. In the preferred embodiment, since relative positioning is sufficient as the positioning of the child terminal 3, it is not necessary that the posture with respect to the absolute azimuth is also known regarding the child terminal's initial posture, although the details will be described later. However, in the lost child search system 1 in the preferred embodiment, it is necessary to convert the positioning information 314 in the child terminal 3, which is relative, to relative positional information in the parent terminal 2 in the parent terminal 2.

Therefore, the positional relationship between the child terminal's initial posture and the parent terminal's initial posture must be known, and it is assumed in the preferred embodiment that the child terminal's initial posture is the same as the parent terminal's initial posture. Here, the "same posture" means that each of the postures is determined such that the directions of the three axes of the gyro sensor 25 and those of the three axes of the gyro sensor 35 are in the same. In a case where the parent terminal 2 and child terminal 3 are the same devices, since the gyro sensor 25 and the gyro sensor 35 are arranged in the same manner on the substrate, the directions of the three axes of the gyro sensor 25 and those of the gyro sensor 35 are in the same directions (are coincident with each other, respectively) by placing the parent terminal 2 and the child terminal 3 to have the same posture apparently. However, in a case where the parent terminal 2 and child terminal 3 are formed as different devices as shown in FIG. 1, it is necessary to care for the directions of the three axes of the gyro sensor 25 and those of the gyro sensor 35 for achieving the "same posture".

The positioning control unit 304 starts the acceleration sensor 36 in accordance with the decision information 312. More specifically, the positioning control unit 304 starts the acceleration sensor 36 at a timing at which the decision information 312 is rewritten to "0". That is, the acceleration sensor 36 is not started by the operation start signal. Therefore, after the operation is started, it is possible to suppress the power consumption, as compared with a conventional technique in which the acceleration sensor has to be always activated.

Further, the positioning control unit 304 identifies the posture of the child terminal 3 with respect to the child terminal's initial posture based on the angular velocity information 350 acquired by the gyro sensor 35. That is, the posture is identified in the child terminal 3 by cooperation of the gyro sensor 35 and the positioning control unit 304. Therefore, the gyro sensor 35 and the positioning control unit 304 correspond to a posture identification element in the child terminal 3 in the preferred embodiment.

Furthermore, the positioning control unit 304 performs relative positioning of the own terminal based on the identified posture of the child terminal 3 and the acceleration information 360 measured by the acceleration sensor 36, to create the positioning information 314. However, as described before, the acceleration sensor 36 is not started by the operation start signal. Therefore, the positioning control unit 304 does not perform relative positioning of the own terminal, nor creates the positioning information 314, before the acceleration sensor 36 is started (before it is decided that search is required). That is, the child terminal 3 in the preferred embodiment can suppress the power consumption, as compared with a case where those calculations are always performed. Please note that as a method for obtaining the relative positional information (positioning information 314) based on the angular velocity information 350 and the acceleration information 360, a conventional technique can be applied as appropriate and therefore the detailed description thereof is omitted.

After the search of its own terminal is decided to be necessary by the intensity decision unit 302, the motion detection unit 305 detects a motion that is equal to or larger than a threshold value (hereinafter, referred to as a "threshold a") based on the acceleration information 360 measured by the acceleration sensor 36 of its own terminal. In the preferred embodiment, the motion detection unit 305 immediately detects the motion equal to or larger than the threshold value a by referring to the acceleration information 360 directly. However, when the motion detection unit 305 indirectly refers to the acceleration information 360 by referring to the positioning information 314, it is possible to accurately detect the motion of interest, although the detection speed is delayed.

Also, the motion detection unit 305 evaluates whether or not the radio wave intensity Fs increases by referring to the intensity information 311, and decides whether or not the detected motion that is equal to or larger than the threshold a is a motion towards the parent terminal 2. Further, the motion detection unit 305 transmits the decision result to the information creation unit 303.

As a method for identifying the direction of the detected motion that is equal to or larger than the threshold a, it is also possible to query a change in relative position during that period (the relative position information 212) to the parent terminal 2. However, in such a configuration, the decision may be delayed. Therefore, it is a matter to be chosen as appropriate, depending on the situation, which method is used for identifying the direction of the motion.

The above is the description of the structure and functions of the lost child search system 1 in the preferred embodiment. Next, a method for searching a lost child using the lost child search system 1 (a lost child search method) is described.

Figure 6:
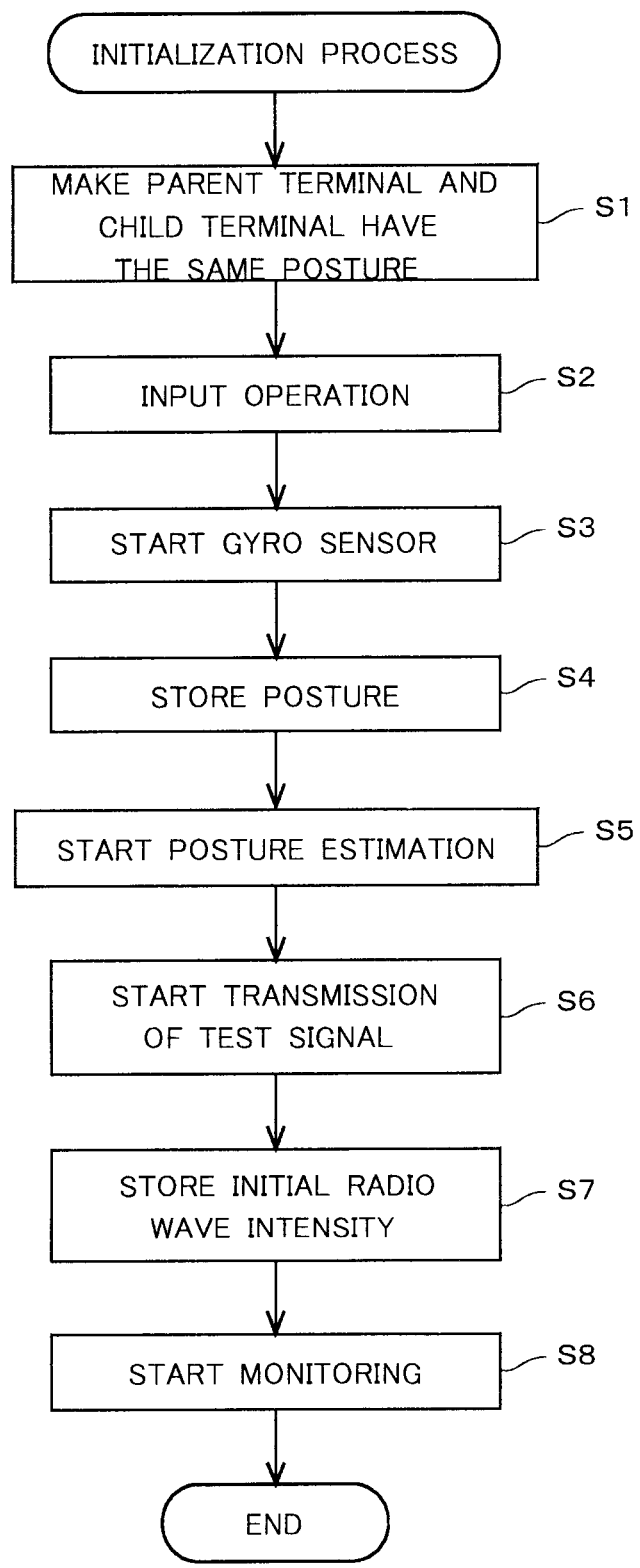
FIG. 6 is a flowchart illustrating an initialization process performed in a lost child search method.

FIG. 6 is a flowchart illustrating an initialization process performed in the lost child search method. The lost child search system 1 has to perform the initialization process first, when starting the operation.

When the initialization process is started, the searcher and the search object make the parent terminal 2 and the child terminal 3 have the same posture (Step S1). As described before, the term "same posture" in Step S1 means adjustment of the posture of the parent terminal 2 and the posture of the child terminal 3 such that the directions of the three axes of the gyro sensor 25 and those of the gyro sensor 36 are coincident with each other.

The searcher then operates the operation unit 22 of the parent terminal 2 to input the operation start signal to the parent terminal 2, while maintaining the posture in Step S1. Also, the search object operates the operation unit 32 of the child terminal 3 to input the operation start signal to the child terminal 3, while maintaining the posture in Step S1. In this manner, the input operation of the operation start signal to the parent terminal 2 and the child terminal 3 is executed (Step S2).

When the input operation of the operation start signal is finished, the positioning control unit 201 to which the operation start signal is transmitted from the operation unit 22 starts the gyro sensor 25. Similarly, the positioning control unit 304 to which the operation start signal is transmitted from the operation unit 32 starts the gyro sensor 35 (Step S3). Thus, the acquisition of the angular velocity information 250 and the acquisition of the angular velocity information 350 are started in the parent terminal 2 and the child terminal 3, respectively.

When the acquisition of the angular velocity information 250 and 350 is started, the lost child search system 1 stores the parent terminal's initial posture and the child terminal's initial posture (Step S4). In Step S4, the positioning control unit 201 identifies and stores the parent terminal's initial posture based on the angular velocity information 250. Similarly, in Step S4, the positioning control unit 304 identifies and stores the child terminal's initial posture based on the angular velocity information 350.

When Step S4 is finished, thereafter, the positioning control units 201 and 304 start posture estimation of the parent terminal 2 and the child terminal 3, respectively (Step S5). Thus, in the lost child search system 1, during the operation, the measurement by the gyro sensors 25 and 35 is continued, and the posture estimation continues to be performed based on the angular velocity information 250 and 350 obtained by the measurement.

The communication control unit 200 to which the operation start signal inputted in Step S2 is transmitted controls the communication unit 27 to start transmission of the test signal, in parallel with the processes in Steps S3 to S5. Thus, the communication unit 27 starts transmission of the test signal to the child terminal 3 (Step S6). After this, the communication unit 27 continues to transmit the test signal at intervals of the period Tt in the lost child search system 1 in the preferred embodiment, unless otherwise described.

When the communication unit 37 receives the test signal transmitted in Step S6, the intensity detection unit 301 of the child terminal 3 detects the radio wave intensity Fs of the test signal received by the communication unit 37. The intensity detection unit 301 then creates the intensity information 311 by regarding the detected radio wave intensity Fs as the initial wave intensity Fs0, and stores it in the storage device 21 (Step S7).

In the above-described manner, monitoring for the search object (child terminal 3) is started (Step S8) and the initialization process is ended in the lost child search system 1. When the initialization process is ended in this manner, the lost child search system 1 shifts to an operation state.

Figure 7:
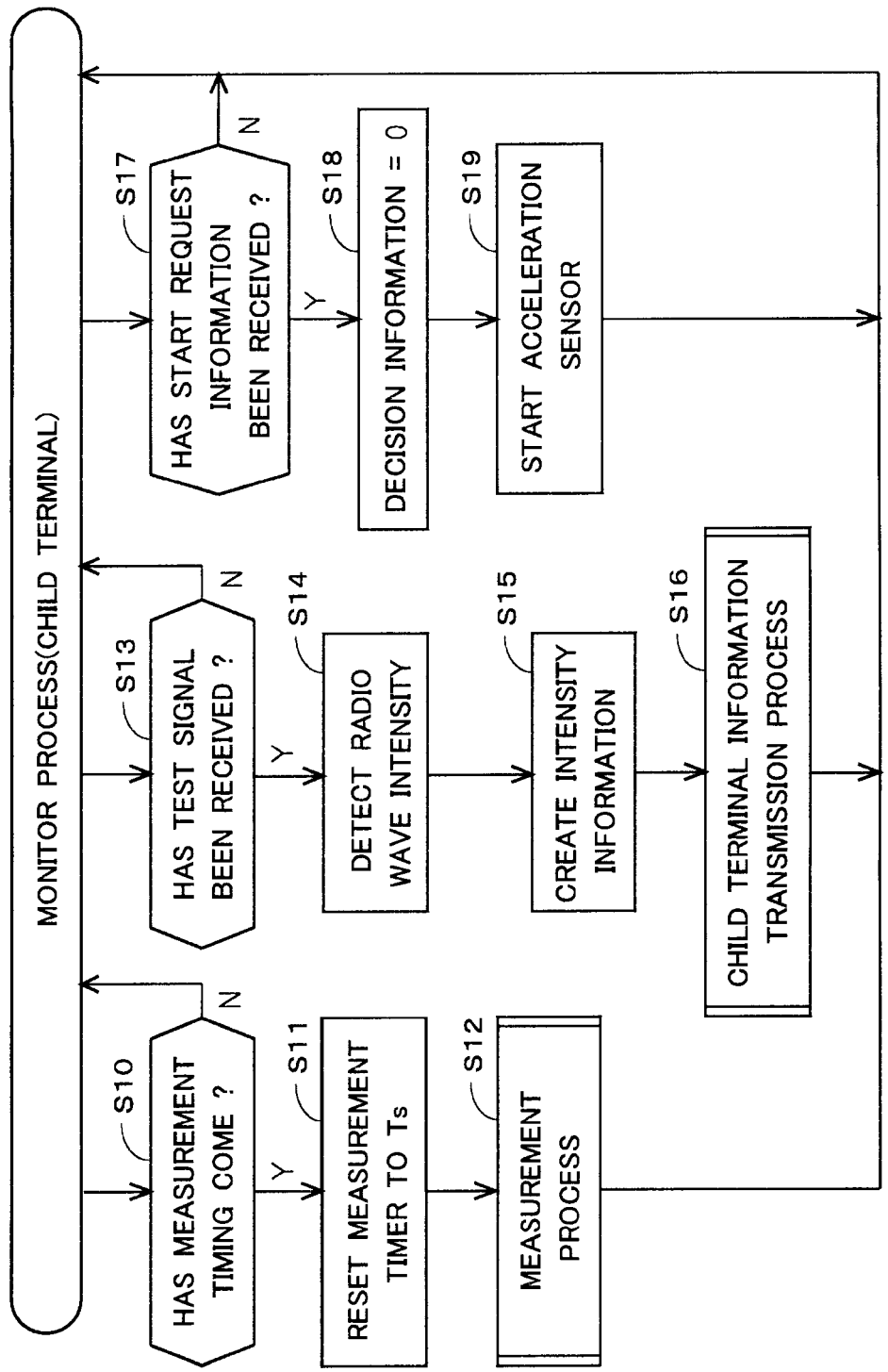
FIG. 7 is a flowchart illustrating a portion of a monitor process, which is performed by the child terminal.

FIG. 7 is a flowchart illustrating a portion of a monitor process performed by the child terminal 3. Please note that the monitor process is a process that is started by Step S8 in the initialization process and is a process that the lost child search system 1 monitors the search object and notifies the searcher of the location of the search object when the search object got lost (when the search object is decided as being lost).

When the monitor process is started, the child terminal 3 is placed in a state in which it monitors arrival of a measurement timing (Step S10), reception of the test signal (Step S13), and reception of the start request information (Step S17). Hereinafter, this state is referred to as a "monitor state" in the child terminal. Please note that in the monitor state, the states monitored by the child terminal 3 are not limited to Steps S10, S13, and S17.

In the monitor state, when the measurement period Ts has elapsed and the measurement timing has come, the CPU 30 gives Yes as the decision result in Step S10, sets "Ts" in a measurement timer for measuring the measurement timing (Step S11), and starts a measurement process (Step S12).

Figure 8:
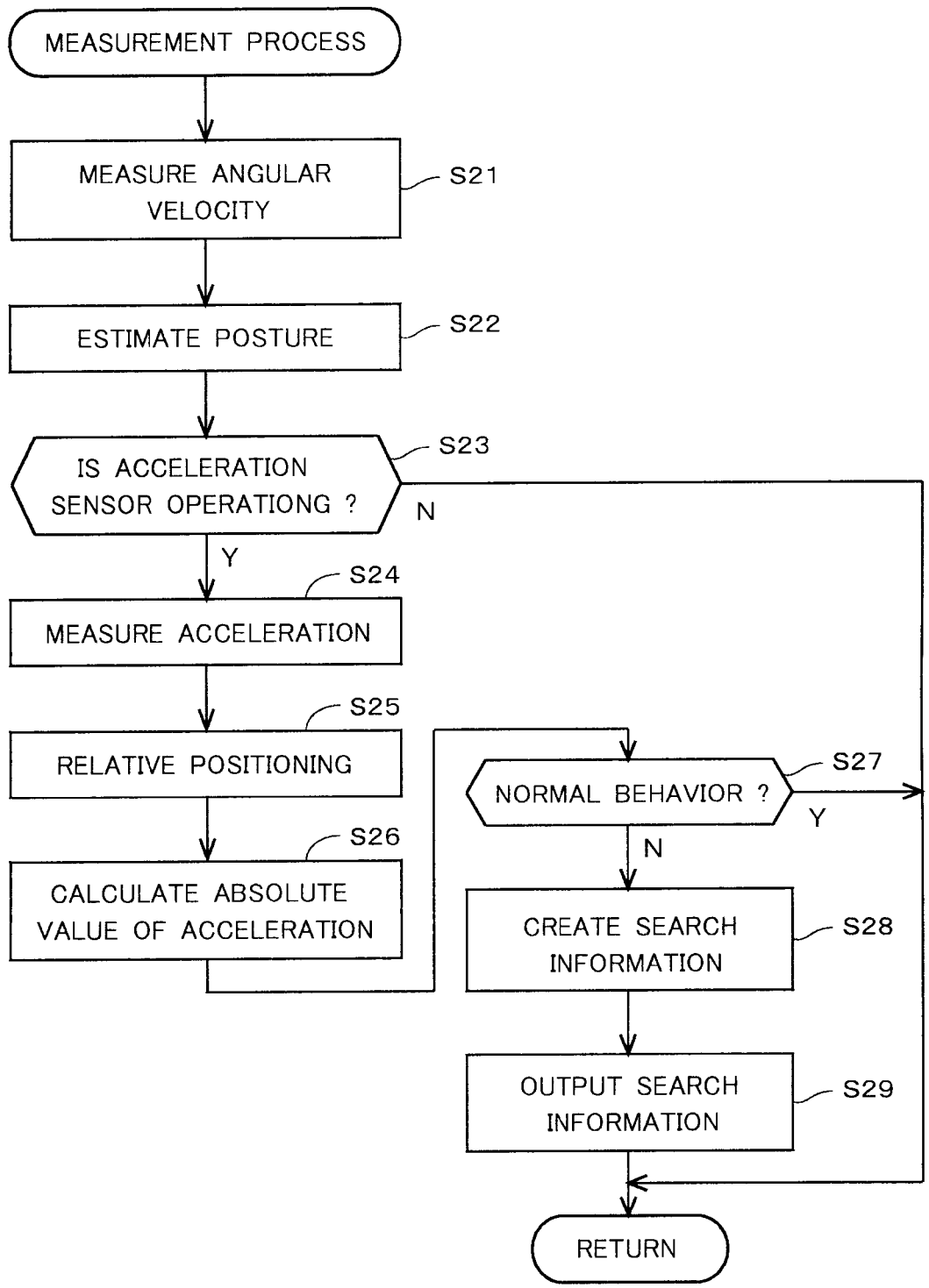
FIG. 8 is a flowchart illustrating a measurement process performed by the child terminal.

FIG. 8 is a flowchart illustrating the measurement process performed by the child terminal 3.

When the measurement process is started, the CPU 30 reads the measurement value of the gyro sensor 35. Thus, the angular velocity is measured and the angular velocity information 350 is acquired in the child terminal 3 (Step S21).

When new angular velocity information 350 is acquired in Step S21, the positioning control unit 304 estimates the posture of the child terminal 3 based on that angular velocity information 350 (Step S22) and creates the positioning information 314.

The positioning control unit 304 then refers to the decision information 312 to decide whether or not the acceleration sensor 36 is already operating (Step S23). In Step S23, the positioning control unit 304 decides that the acceleration sensor 36 is operating, when the decision information 312 is "0". In a case where the acceleration sensor 36 is not operating (No in Step S23), the child terminal 3 ends the measurement process and returns to the process shown in FIG. 7.

On the other hand, in a case where the acceleration sensor 36 is already operating, the CPU 30 gives Yes as the decision result in Step S23, and reads the measurement value of the acceleration sensor 36. In this manner, the acceleration is measured and the acceleration information 360 is acquired (Step S24) in the child terminal 3.

When new acceleration information 360 is acquired, the positioning control unit 304 performs relative positioning of the child terminal 3 based on the posture estimated in Step S22 and that acceleration information 360 (Step S25), obtains the relative position, and creates the positioning information 314.

As described above, while the monitor process is performed, the posture is estimated at every measurement period Ts in the child terminal 3. At this time, if the acceleration sensor 36 is operating, the relative positioning is also performed. That is, the relative position of the child terminal 3 relative to the position at which the previous positioning was performed is obtained. These results are recorded as the positioning information 314.

When Step S25 is performed, the motion detection unit 305 calculates the absolute value of the acceleration of the child terminal 3 (that indicates the magnitude of the acceleration) based on the acceleration information 360 acquired in Step S24 (Step S26). Further, the motion detection unit 305 decides whether the behavior of the search object is a normal behavior based on the absolute value of the acceleration obtained by calculation (Step S27).

In Step S27, the motion detection unit 305 decides whether or not the acceleration obtained in Step S26 is larger than the threshold value a. When the acceleration is larger than the threshold value a, the motion detection unit 305 regards the movement as being rapid, and further decides whether or not the moving direction of the search object during that period is a direction toward the searcher (parent terminal 2). This decision is made based on whether or not the radio wave intensity Fs increases in that period.

That is, the motion detection unit 305 refers to the intensity information 311, and compares the radio wave intensities Fs before and after the movement. When the radio wave intensity increases, the motion detection unit 305 regards the search object as moving in the direction in which the search object comes closer to the searcher and regards that movement as the normal behavior (gives Yes as the decision result in Step S27). When the behavior (movement) of the search object is decided as the normal behavior, the child terminal 3 ends the measurement process and returns to the process shown in FIG. 7.

On the other hand, when the radio wave intensity after the movement does not increase from that before the movement, the motion detection unit 305 regards the search object as not moving in the direction in which it gets closer to the searcher and does not regard the movement as normal behavior (gives No as the decision result in Step S27). In this case, the motion detection unit 305 transmits that it has detected an abnormal behavior of the search object to the information creation unit 303.

The information creation unit 303 then creates the search information 315 to be output when the search object is moving rapidly (Step S28). The case in which the decision result is No in Step S27 is a case in which the search for the search object has been started and, in that situation, the search object has moved rapidly in a direction other than the direction in which the search object does not come closer to the searcher. If such movement is left, the search object may be involved in an accident (run out into traffic), or there is a risk that the search object gets out of the communicable range of near-field wireless communication and thereafter the search cannot be performed. Therefore, in this case, it is preferable to output an alarm for suppressing the movement of the search object. Thus, the information creation unit 303 creates the search information 315 for outputting the alarm in Step S28.

As the search information 315 created in Step S28, audio information for urging the search object to remain there (the voice of the searcher (mother) or the voice of an animated character) and image information for calming the search object by displaying animations are considered, for example. However, the search information 315 is not limited to the above. It is preferable that the search information 315 is selected in accordance with the search object appropriately.

When Step S28 is executed, the display unit 33 and the speaker 34 output the search information 315 created in Step S28. That is, the display unit 33 and speaker 34 in the preferred embodiment correspond to an alarm output element of the present invention. Please note that when executing Step S29, the child terminal 3 ends the measurement process and returns to the monitor state.

Returning to FIG. 7, in the monitor state, when receiving the test signal transmitted from the parent terminal 2, the CPU 30 gives Yes as the decision result in Step S13 and detects the radio wave intensity Fs of the test signal received by the intensity detection unit 301 (Step S14). Further, the intensity detection unit 301 creates the intensity information 311 by using the detected radio wave intensity as the current radio wave intensity Fs and stores it (Step S15).

When the decision result is Yes in Step S13, the communication control unit 300 transmits that the communication unit 37 has received the test signal to the information creation unit 303. In response to this, the child terminal 3 performs a child terminal information transmission process (Step S16).

Figure 9:
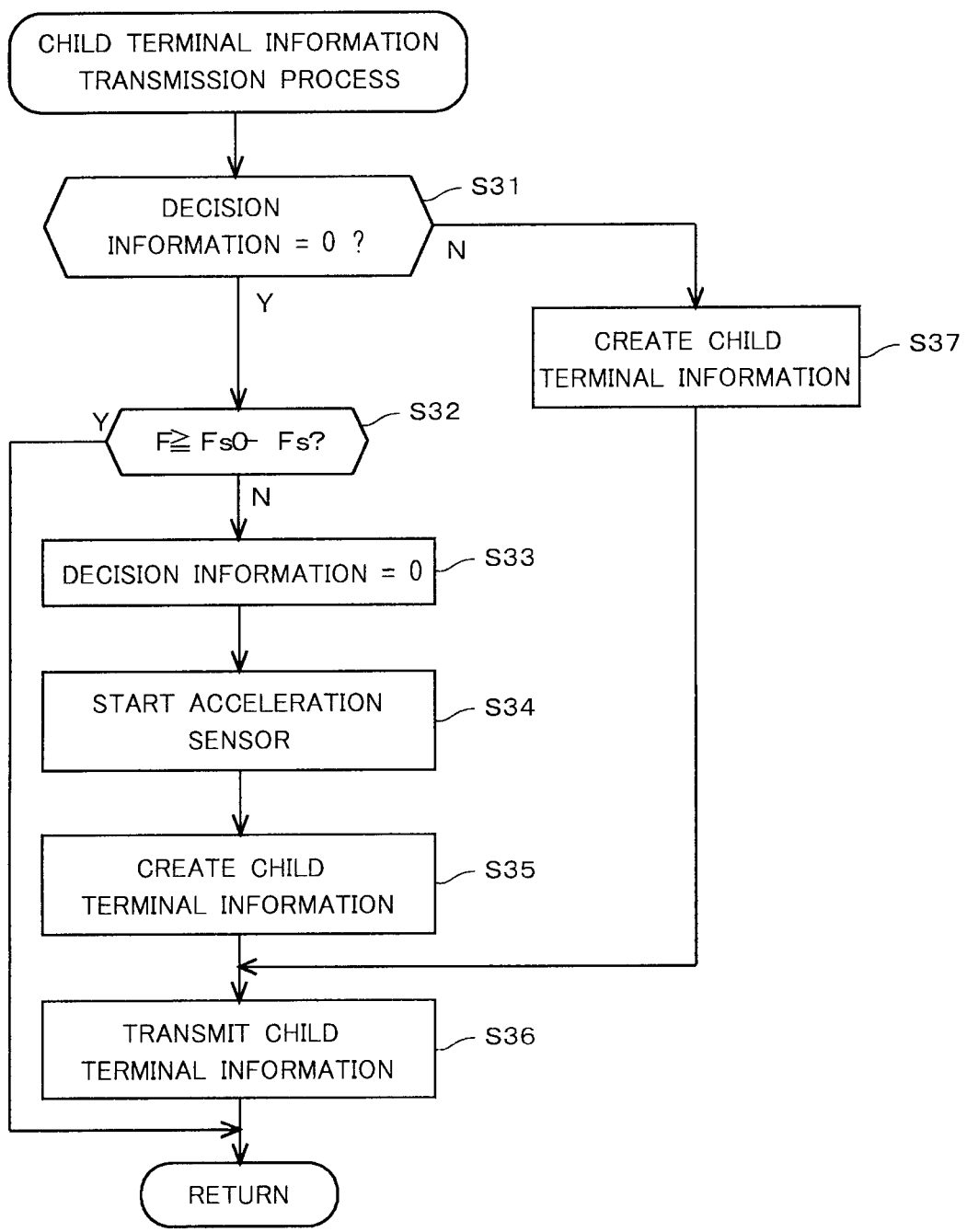
FIG. 9 is a flowchart illustrating a child terminal information transmission process performed in the child terminal.

FIG. 9 is a flowchart illustrating the child terminal information transmission process executed in the child terminal 3.

When the child terminal information transmission process is started, the information creation unit 303 decides whether or not the decision information 312 is "0" (Step S31). As already described, in the preferred embodiment, the test signal transmitted by the parent terminal 2 after the search is started is regarded as request information (information when the parent terminal 2 requests the child terminal information 313 from the child terminal 3). Therefore, upon receiving the test signal, the child terminal 3 has to decide whether or not that test signal is the request information. On the other hand, in the preferred embodiment, the initial value of the decision information 312 is "1" and is rewritten to "0" when it is decided that the search is necessary. From the above, the test signal received when the decision information 312 is "0" is the request information. Therefore, Step S31 corresponds to a process of deciding whether or not the received test signal is the request information.

When the received test signal is not the request information (No in Step S31), the intensity decision unit 302 refers to the intensity information 311, acquires the initial radio wave intensity Fs0 and the current radio wave intensity Fs, and decides whether or not the attenuation value of the radio wave intensity is equal to or smaller than the threshold value F (Step S32). As already described, the process in Step S32 is the process of deciding whether or not the child terminal 3 is in the not-yet-searched area 9, by using the current radio wave intensity Fs as an index.

In a case where the attenuation value of the radio wave intensity is equal to or smaller than the threshold value F and it is decided that the child terminal 3 is in the not-yet-searched area 9 (Yes in Step S32), the intensity decision unit 302 decides that there is no need for searching for the search object. In this case, the intensity decision unit 302 maintains the decision information 312 at "1", ends the child terminal information transmission process, and returns to the process shown in FIG. 7. In this case, no child terminal information 313 is transmitted to the parent terminal 2.

On the other hand, in a case where the attenuation value of the radio wave intensity is larger than the threshold value F and the child terminal 3 is decided to be in the outside of the not-yet-searched area 9 (No in Step S32), the intensity decision unit 302 decides that the search for the search object is necessary. That is, the intensity decision unit 302 rewrites the decision information 312 to "0" (Step S33).

In response to the rewriting of the decision information 312 to "0", the positioning control unit 304 starts the acceleration sensor 36 (Step S34). That is, in the lost child search system 1 in the preferred embodiment, the acceleration sensor 36 is not started for a time period from the start of the operation of the system 1 to execution of Step S34. Therefore, it is possible to suppress the power consumption, as compared with a conventional technique.

When the decision information 312 is rewritten to "0" in Step S33, the information creation unit 303 creates the child terminal information 313 (Step S35). The child terminal information 313 created in Step S35 is different from the child terminal information 313 created in the process described later, and does not include the intensity information 311 and the positioning information 314 but includes the start request information (information indicating that the start of the search is decided to be necessary by the intensity decision unit 302).

When new child terminal information 313 is created by execution of Step S35, the communication control unit 300 acquires the created child terminal information 313 and controls the communication unit 37 to transmit it to the parent terminal 2. Thus, the communication unit 37 transmits the created child terminal information 313 to the parent terminal 2 (Step S36). Please note that when executing the process in Step S36, the child terminal 3 ends the child terminal information transmission process and returns to the process shown in FIG. 7.

Next, processing in a case where the decision result in Step S31 is Yes is described. The case in which the decision result is Yes in Step S31 is a case in which the received test signal is the request information. In this case, the information creation unit 303 creates the child terminal information 313 including the intensity information 311 and the positioning information 314 (Step S37).

When new child terminal information 313 is created by execution of Step S37, the communication control unit 300 acquires the created child terminal information 313 and controls the communication unit 37 to transmit it to the parent terminal 2. Thus, the communication unit 37 transmits the created child terminal information 313 to the parent terminal 2 (Step S36). In this manner, after the search is started, the radio wave intensity Fs in the child terminal 3 and the relative position (positioning result) are transmitted to the parent terminal 2.

The case where the decision result is Yes in Step S31 is a case in which the search is already started. Therefore, usually, not only the intensity information 311 but the positioning information 314 including the result of relative positioning (relative position) is also present. However, if these units of information have not been created yet because of the measurement timing or the like or if the intensity information 311 and the positioning information 314 are not updated after previous execution of Step S37, Steps S37 and S36 may be skipped. After executing the process of Step S36, the child terminal 3 ends the child terminal information transmission process and returns to the process shown in FIG. 7.

Referring back to FIG. 7, in the monitor state, when the communication unit 37 receives the start request information transmitted from the parent terminal 2, the CPU 30 gives Yes as the decision result in Step S17. The start request information transmitted from the parent terminal 2 is information to be transmitted to the child terminal 3 when the search start instruction signal is input by the searcher in the parent terminal 2. That is, when the start request information is received in the child terminal 3, the child terminal 3 has to prepare to start the search and then perform the necessary processing for the search.

Therefore, when the CPU 30 gives Yes as the result in the decision in Step S17, the communication control unit 300 transmits the receipt of the start request information to the information creation unit 303. In response to this, the information creation unit 303 rewrites the decision information 312 to "0" (Step S18). When the decision information 312 is rewritten to "0", the positioning control unit 304 starts the acceleration sensor 36 (Step S19). Thus, the child terminal 3 is ready for starting the search, and thereafter transmits the child terminal information 313 to the parent terminal 2 by executing Step S36 every time the child terminal 3 receives the test signal (request information), while updating the positioning information 314 by executing Step S25. After executing the process in Step S19, the child terminal 3 returns to the monitor state again.

The above is the description of the monitor process performed in the child terminal 3 in the preferred embodiment. Next, a monitor process performed in the parent terminal 2 in the preferred embodiment is described.

Figure 10:
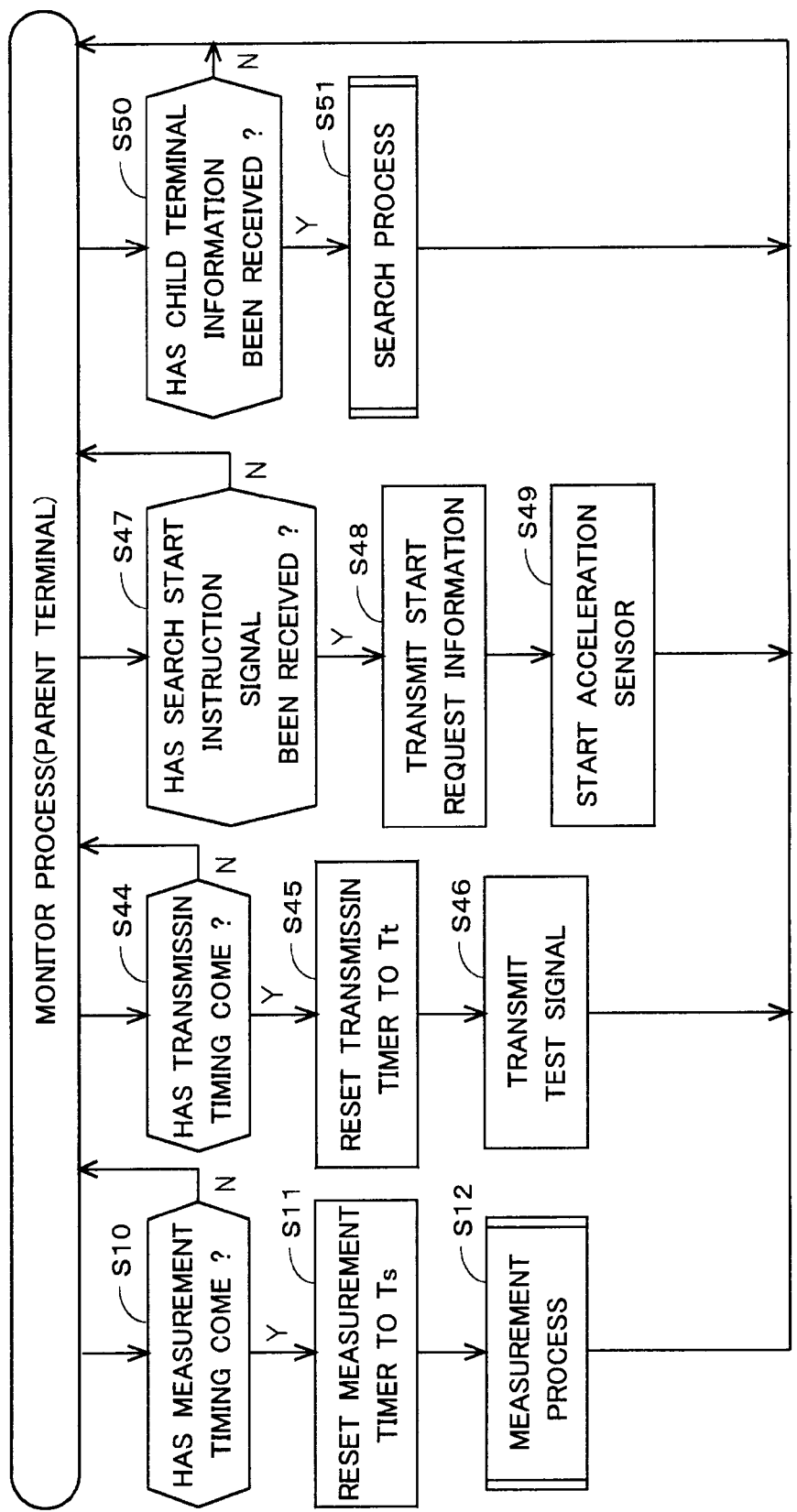
FIG. 10 is a flowchart illustrating the monitor process performed in the parent terminal.

FIG. 10 is a flowchart illustrating the monitor process performed in the parent terminal 2.

When the monitor process is started, the parent terminal 2 is placed in a state in which it monitors arrival of a measurement timing (Step S41), arrival of a transmission timing (Step S44), the presence or absence of input of the search start instruction signal (Step S47), and reception of the child terminal information 313 (Step S50). Hereinafter, this state is referred to as a "monitor state" in the parent terminal 2. Please note that in the monitor state, the states monitored by the parent terminal 2 are not limited to Steps S41, S44, S47, and S50.

In the monitor state, when the measurement period Ts has elapsed and the measurement timing has come, the CPU 20 gives Yes as the result in the decision in Step S41, sets "Ts" in a measurement timer for measuring the measurement timing (Step S42), and starts a measurement process (Step S43).

Figure 11:
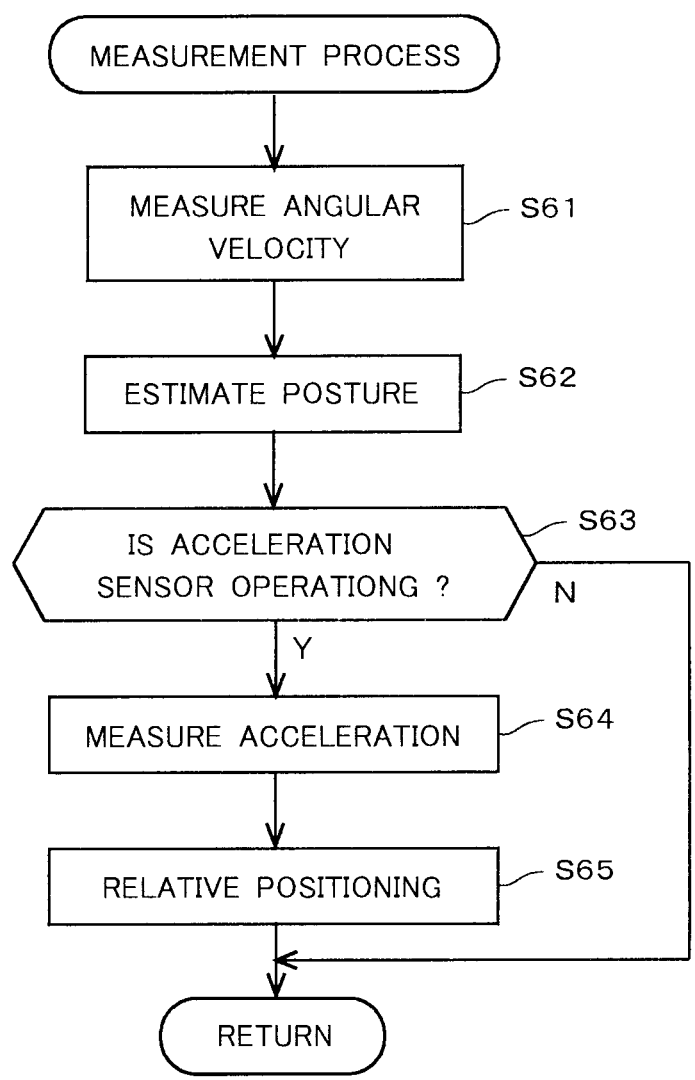
FIG. 11 is a flowchart illustrating a measurement process performed by the parent terminal.

FIG. 11 is a flowchart illustrating the measurement process to be performed by the parent terminal 2.

When the measurement processing is started, the CPU 20 reads the measurement value of the gyro sensor 25. In this manner, the angular velocity is measured and the angular velocity information 250 is acquired in the parent terminal 2 (Step S61).

When new angular velocity information 250 is acquired by Step S61, the positioning control unit 201 estimates the posture of the parent terminal 2 (Step S62) based on that angular velocity information 250, and creates the positioning information 211.

The positioning control unit 201 then decides whether the acceleration sensor 26 is already operating (Step S63). When the acceleration sensor 26 is not operating (No in Step S63), the parent terminal 2 ends the measurement process and returns to the process shown in FIG. 10.

On the other hand, when the acceleration sensor 26 is already operating, the CPU 20 gives Yes as the decision result in Step S63, and reads the measurement value of the acceleration sensor 26. In this manner, the acceleration is measured and the acceleration information 260 is acquired in the parent terminal 2 (Step S64).

When new acceleration information 260 is acquired, the positioning control unit 201 performs relative positioning of the parent terminal 2 based on the posture estimated in Step S62 and that acceleration information 260 (Step S65), obtains the relative position, and creates the positioning information 211.

In this manner, while the monitor process is executed, the posture is estimated at every measurement period Ts in the parent terminal 2. At this time, the relative positioning is also performed if the acceleration sensor 26 is operating. That is, the relative position of the parent terminal 2 relative to the position at which previous positioning was performed. These results are recorded as the positioning information 211. Please note that when executing Step S65, the parent terminal 2 ends the measurement process and returns to the process shown in FIG. 10.

Referring back to FIG. 10, in the monitor state, when the transmission period Tt has elapsed and the transmission timing has come, the CPU 20 gives Yes as the decision result in Step S44, and sets "Tt" to a transmission timer for measuring the transmission timing (Step S45). Then, the communication control unit 200 controls the communication unit 27 to transmit the test signal. Thus, the communication unit 27 transmits the test signal to the child terminal 3 (Step S46).

As described above, in the parent terminal 2, the test signal is transmitted every time the transmission period Tt has elapsed, regardless of whether or not search is started. However, the test signal after the search is started is interpreted as the request information in the child terminal 3, as already described. After executing Step S46, the parent terminal 2 returns to the monitor state again.

In the monitor state, when the operation unit 22 is operated and the search start instruction signal is input, the CPU 20 gives Yes as the result in the decision in Step S47. Then, the communication control unit 200 controls the communication unit 27 to transmit the start request information to the child terminal 3. Thus, the communication unit 27 transmits the start request information to the child terminal 3 (Step S48). As already explained, in the child terminal 3 that has received the start request information, the decision information 312 is rewritten to "0" (Step S18) and the search is started, regardless of the radio wave intensity Fs.

When Step S48 is executed, the positioning control unit 201 starts the acceleration sensor 26 (Step S49).

In this manner, in the lost child search system 1, the searcher operates the operation unit 22 at a given timing to input the search start instruction signal in the parent terminal 2, thereby the search can be started, regardless of the radio wave intensity Fs. Therefore, even in a situation in which the attenuation value of the radio wave intensity Fs is smaller than the threshold value F and the search object is likely to be present in a relatively close place, the search can be started when the operator has lost sight of the search object and wants to search it. After executing Step S49, the parent terminal 2 returns to the monitor state again.

In the monitor state, when the communication unit 27 receives the child terminal information 313, the CPU 20 gives Yes as the decision result in Step S50. Then, the communication control unit 200 stores that child terminal information 313 in the storage device 21.

When storing the received child terminal information 313 in the storage device 21, the parent terminal 2 performs a search process (Step S51).

Figure 12:
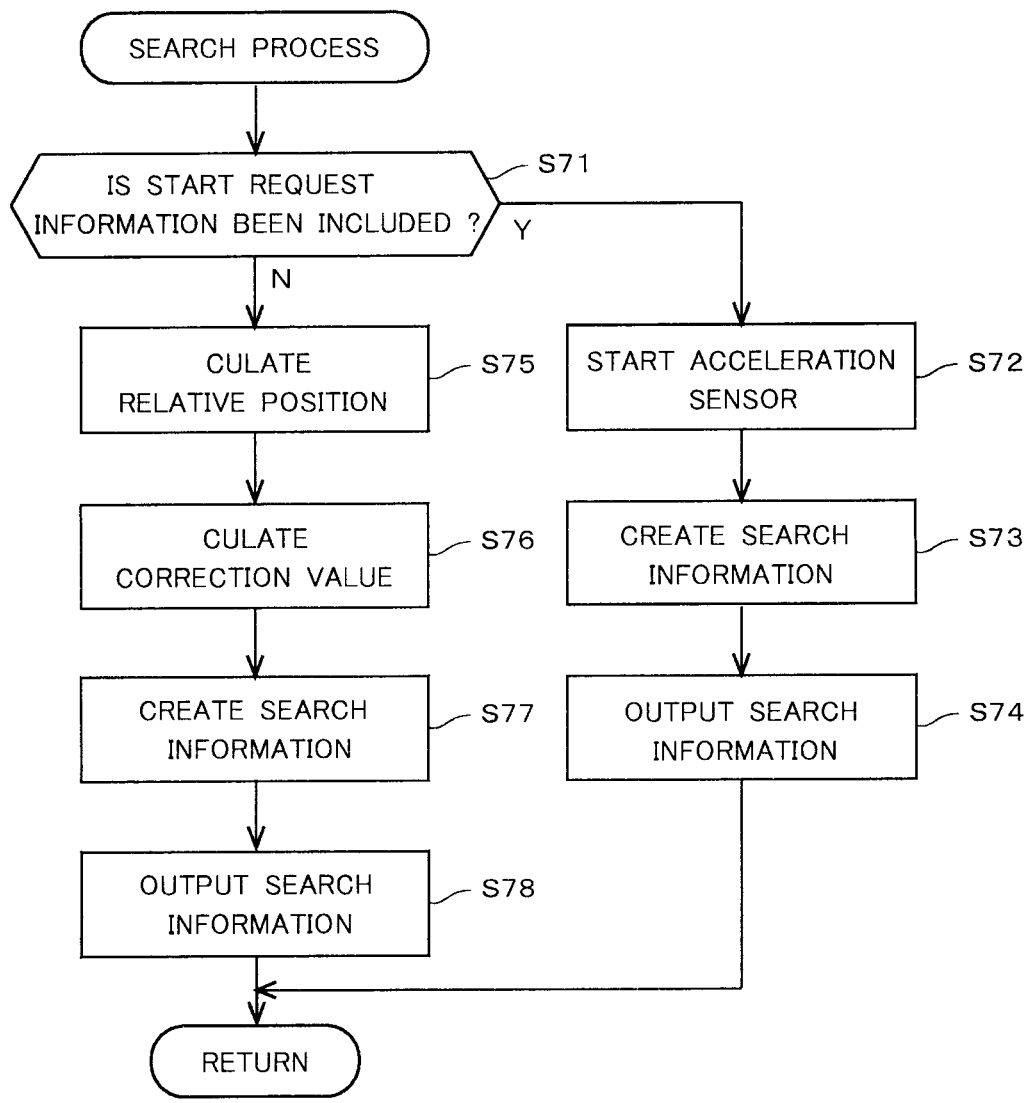
FIG. 12 is a flowchart illustrating a search process performed by the parent terminal.

FIG. 12 is a flowchart illustrating the search process to be performed by the parent terminal 2.

When the search process is started, the communication control unit 200 decides whether or not the start request information is included in the received child terminal information 313 (Step S71). Please note that the child terminal information 313 including the start request information is the child terminal information 313 that does not contain the intensity information 311 and the positioning information 314, as previously explained. Therefore, it is possible to perform the decision in Step S71 based on the presence/absence of the intensity information 311 and the positioning information 314, for example.

In a case where the child terminal information 313 received by the communication unit 27 contains the start request information (Yes in Step S71), the communication control unit 200 transmits that fact to the positioning control unit 201 and the information creation unit 204.

The positioning control unit 201, to which the reception of the start request information is transmitted from the communication control unit 200, starts the acceleration sensor 26 in order to start the search (Step S72). Also, the information creation unit 204, to which the reception of the start request information is transmitted from the communication control unit 200, creates the search information 214 indicating that the search has been started (Step S73). Then, the display unit 23 and the speaker 24 output the search information 214 created in Step S73 (Step S74).

In the lost child search system 1, except for a case where the searcher has input the search start instruction signal, the search is automatically started by using the radio wave intensity of the test signal transmitted from the parent terminal 2, as an index. A case where the parent terminal 2 has received the start request information from the child terminal 3 is a case where the search has been automatically started in the lost child search system 1.

The search in the lost child search system 1 assists the actual search by the searcher by providing information on the search object (position information) to the searcher. Therefore, if the searcher itself does not become aware that the search has been started, the information that is provided is not effectively utilized, and the actual search (search by the searcher) may not be performed. In addition, it is likely that the search object gets lost when the searcher's awareness of the search object is reduced because the searcher is distracted in any event.

Therefore, in particular, when the search is automatically started, it is important to return the searcher's awareness from the event to which the searcher is distracted to the search object (make the searcher become aware of the search object) by reporting the start of the search itself to the searcher.

Accordingly, when Step S72 is executed, the parent terminal 2 in the preferred embodiment creates information for notifying the searcher of the start of the search (search information 214) by the information creation unit 204, and the display unit 23 and the speaker 24 output that information to notify the searcher. In this case, as the search information 214 to be output, audio information for reproducing a warning sound or a voice message informing that a child got lost, or text information for switching the screen of another application that is being viewed and displaying image information or a message informing a stray occurrence (or partially overwriting the screen with the image information or the message) is considered, for example. It is preferable that the search information 214 output in Step S74 is in the form that can be immediately sensed, even when the searcher is not aware of the parent terminal 2.

In this manner, when deciding that the search object is away from the searcher, the lost child search system 1 can notify the searcher of that fact promptly, thereby directing the searcher's awareness to the search object. Therefore, it is possible to effectively prevent the situation from becoming worse (i.e., the search object further moves away) because of the unawareness of the searcher.

On the other hand, in a case where the searcher itself has instructed the start of the search (a case where the searcher inputs the search start instruction signal), the parent terminal 2 transmits the start request information to the child terminal 3 (Step S48), and starts the operation of the acceleration sensor 26 (Step S49), as already described. However, the process of notification of the start of the search (Step S73, S74) is not performed. This is because in the case where the searcher itself has instructed the start of the search, the searcher already knows that the search has been started. However, the lost child search system 1 may be configured to perform the processes corresponding to Steps S73 and S74 for notifying that the lost child search system 1 has successfully started the search, also in such a case.

Next, a case where the decision result in Step S71 is No is described. The case in which the decision result in Step S71 is No is a case in which the child terminal information 313 received by the communication unit 27 is not the start request information. In this case, the relative position calculation unit 202 obtains the relative positional relationship between the parent terminal 2 and the child terminal 3 based on the positioning result by the positioning control unit 201 of the parent terminal 2 (positioning information 211) and the positioning result by the positioning control unit 304 of the child terminal 3 (the positioning information 314) (Step S75), to create the relative position information 212.

The child terminal information 313 in the case where the decision result in Step S71 is No contains the radio wave intensity Fs of the test signal received in the child terminal 3 (intensity information 311) and the relative position of the child terminal 3 (positioning information 314). Therefore, every time the child terminal information 313 is stored in the storage device 21 by the communication control unit 200, the relative position calculation unit 202 refers to the newly stored child terminal information 313. Then, in a case where that child terminal information 313 includes the intensity information 311 and the positioning information 314 (i.e., in the case where the decision result is No in Step S71), the relative position calculation unit 202 further refers to the positioning information 211. In this manner, the relative position calculation unit 202 acquires the positioning information 211 and positioning information 314 in Step S75.

Figure 13:
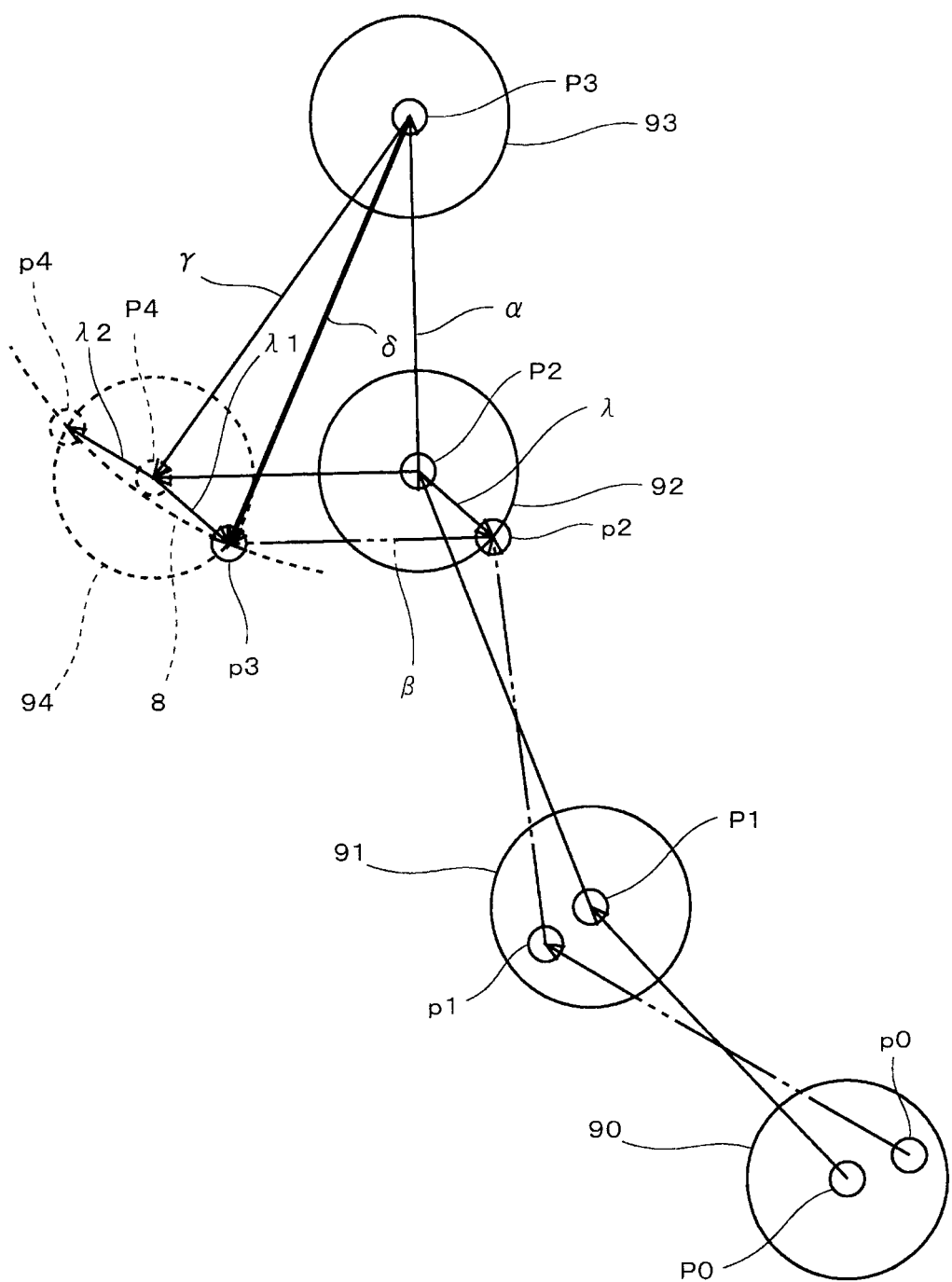
FIG. 13 shows an example of expected behaviors of a searcher and a search object.

FIG. 13 is a diagram showing an expected example of behaviors of the searchers and search object. The principle in which the relative position calculation unit 202 calculates the relative position information 212 is described with reference to FIG. 13.

Positions P0, P1, P2, and P3 shown in FIG. 13 are actual positions of the parent terminal 2 (searcher) at respective times. Positions p0, p1, p2, and p3 are actual positions of the child terminal 3 (search object) at respective times. Not-yet-searched areas 90, 91, 92, and 93 represent the not-yet-searched area 9 when the parent terminal 2 is located at the positions P0, P1, P2, and P3, respectively.

When the parent terminal 2 is located at the position P0 or P1, the child terminal 3 is located at the position p0 or p1, respectively. Both the positions p0 and p1 are located within the not-yet-searched area 90 or 91. Therefore, at this time, the lost child search system 1 does not start the search for the child terminal 3.

When the parent terminal 2 moves to the position P2, the child terminal 3 is located at the outer edge of the not-yet-searched area 92 (position p2), and the attenuation value of the radio wave intensity exceeds the threshold value F, and the search is started in the lost child search system 1. The relative positional relationship between the parent terminal 2 and child terminal 3 at this time is defined as a vector λ. At the moment at which the search is started in the lost child search system 1, it is estimated that the child terminal 3 is located at the outer end (circumference) of the not-yet-searched area 9, but it is not possible to identify at which position the child terminal 3 is located on the outer end. Therefore, the vector λ is unknown at this time.

At the next time, the parent terminal 2 moves to the position P3, and the child terminal 3 moves to the position p3. At this time, the relative position calculation unit 202 performs Step S75 and calculates the relative position information 212.

First, when a movement vector when the parent terminal 2 moves from the position P2 to the position P3 is assumed to a vector a, the vector a is known by the positioning information 211. Further, during this movement of the parent terminal 2, the child terminal 3 also moves from the position p2 to the position p3. When it is assumed that a movement vector at this time is a vector β, the vector β is known by the positioning information 314.

In Step S75, the relative position calculation unit 202 adds up the inverse vector of the vector a indicated in the positioning information 211 and the vector β indicated in the positioning information 314 to obtain a vector γ, and uses this vector γ as the relative position information 212. That is, the relative position of the parent terminal 2 obtained with respect to the child terminal 3 is the position P4. In other words, the relative position calculation unit 202 estimates the current position of the child terminal 3 to be the position P4.

Returning to FIG. 12, when Step S75 is performed and the relative position information 212 is obtained by the relative position calculation unit 202, the correction unit 203 calculates a correction value for the relative position information 212 (Step S76).

As shown in FIG. 13, the relative position information 212 correctly estimates the direction in which the child terminal 3 is present to some extent. Therefore, even when the relative position information 212 is output as the search information 214, some effects can be expected. However, the actual position of the child terminal 3 is the position p3 and has a slight deviation from the position P4. This deviation is caused because the vector 2 shown in FIG. 13 is unknown. Therefore, the correction unit 203 in the preferred embodiment calculates the correction value for correcting the deviation between the position p3 and the position P4 (correction information 213) in Step S76. In other words, the correction unit 203 estimates the vector λ.

First, the correction unit 203 calculates a circle 94 indicated with dashed line. The circle 94 is an outer peripheral circle of a range that is to be the not-yet-searched area 9 when the parent terminal 2 is assumed to be located at the position P4. Therefore, the correction unit 203 can estimate the circle 94 based on the threshold value F.

When the parent terminal 2 is located at the position P2, the child terminal 3 should have been located in the outer edge portion of the not-yet-searched area 92. Therefore, the current position of the child terminal 3 can be expected to be present on the circumference of a circle centered on the position P4 (the line of circle 94).

The correction unit 203 then refers to the intensity information 311, thereby obtaining a position at which the radio wave intensity is "Fs (intensity information 311)" when the parent terminal 2 is located at the position P3. Such a position can be obtained as a circle centered on the position P3. In FIG. 13, a portion of the thus obtained circle is shown as a dashed circle 8. Since the current radio wave intensity is observed as "Fs" in the child terminal 3, the child terminal 3 can be expected to be located on the circumference of this circle currently.

From the above, the correction unit 203 obtains the position of the child terminal 3 as the intersection of the circle 94 and the circle 8. In the example of FIG. 13, the correction unit 203 can obtain the positions p3 and p4 as the position of the child terminal 3. In other words, vectors λ1 and λ2 from the position P4 are obtained. Although the true vector λ is the vector λ1, this cannot be determined by only one calculation.

Therefore, in the lost child search system 1, the parent terminal 2 transmits the test signal at every period Tt, acquires the child terminal information 313, and repeatedly calculates the relative position information 212 and the correction information 213, thereby determining which one of the vectors λ1 and λ2 is the true vector λ to determine the vector λ as the correction value.

When Step S76 is performed and the correction information 213 is obtained, the information creation unit 204 obtains the position of the child terminal 3 based on the relative position information 212 (vector γ) and the correction information 213 (vector λ), to create the search information 214 (Step S77). More specifically, the information creation unit 204 performs vector addition of the vector λ to the vector γ to obtain a vector d that is the relative positional relationship between the parent terminal 2 and child terminal 3 after correction, and the information creation unit 204 uses the vector d as the search information 214.

When the search information 214 is obtained, the display unit 23 outputs the search information 214 by displaying it. Thus, the searcher can visually recognize the vector d displayed on the display unit 23, thereby being able to confirm the location of the search object (child terminal 3).

As described above, the lost child search system 1 in the preferred embodiment includes the parent terminal 2 and the child terminal 3 that are two or more portable terminal devices. Each of the parent terminal 2 and child terminal 3 includes the gyro sensor 25, 35 that measures the angular velocity for identifying the posture of its own terminal, the acceleration sensor 26, 36 that measures the acceleration of its own terminal, and the positioning control unit 201, 304 that performs relative positioning of its own terminal based on the identified posture and the measured acceleration. Further, the lost child search system 1 includes: the communication unit 27, 37 for performing data communication by near-field wireless communication using radio waves between the parent terminal 2 and the child terminal 3; the intensity detection unit 301 that detects the radio wave intensity Fs in the near-field wireless communication between the parent terminal 2 and the child terminal 3; the intensity decision unit 302 that decides, in response to the detected radio wave intensity Fs, whether or not the search for the child terminal 3 is required; the relative position calculation unit 202 for obtaining the relative position information 212 that is the relative positional relationship between the parent terminal 2 and the child terminal 3 based on the positioning information 211 and the positioning information 314; the information creation unit 204 that creates the search information 214 based on the relative position information 212; and the display unit 23 and the speaker 24 that output the search information 214 created by the information creation unit 204. Each of the parent terminal 2 and the child terminal 3 further includes the position control unit 201, 304 that makes the acceleration sensor 26, 36 of its own terminal start measurement of the acceleration, in response to the decision result by the intensity decision unit 302 (decision information 312). Thus, it is possible to perform the search for the search object without using a GPS. Furthermore, the search can be performed by simply making the searcher and the search object carry the portable terminal devices that are already widely distributed in the market (smartphones, cellular phones, PDA, and the like) therewith, respectively, and therefore increase in the cost can be suppressed, as compared with a conventional technique. In addition, before it is determined that the search is required, the acceleration sensor 26, 36 is not started, nor the positioning information 211, 314 is calculated. Therefore, as compared with a conventional technique in which the positioning process is performed while the acceleration sensor is always operated, the power consumption is suppressed, thereby it is possible to compensate for a disadvantage of the battery life of the portable terminal device.

In addition, the correction unit 203 is further included that calculates the correction value (correction information 213) for the relative position information 212 obtained by the relative position calculation unit 202, in accordance with the radio wave intensity Fs detected by the intensity detection unit 301. The information creation unit 204 creates the search information 214 based on the correction information 213 obtained by the correction unit 203, thereby being able to provide the search information 214 that is more accurate.

The intensity decision unit 302 compares the difference between the radio wave intensity Fs at the time of measurement and the radio wave intensity Fs0 in the initial state with the threshold value F, thereby deciding whether or not the search is necessary. Thus, the accuracy can be improved, as compared with direct decision using the radio wave intensity.

The display unit 23 and the speaker 24 output the search information 214 on which the decision result by the intensity decision unit 302 is reflected, thereby being able to issue notification of the start of the search.

The child terminal 3 further includes the motion detection unit 305 that detects, after it is decided by the intensity decision unit 302 that the search for that child terminal 3 is required, the motion equal to or larger than the threshold value a based on the acceleration which is measured by the acceleration sensor 36 of its own terminal, and the display unit 33 and the speaker 34 that output the alarm in response to the detection of the motion equal to or larger than the threshold value a. Thus, it is possible to suppress abrupt movement of the search object and suppress the accident of the search object, and it is also possible to prevent the search object from getting out of the coverage of the radio waves. In a case where the child terminal 3 goes out of the coverage of the radio waves of near-field wireless communication by the communication unit 27, it is preferable to perform the search using a wide-area wireless communications network.

The motion detection unit 305 decides whether or not the detected motion equal to or larger than the threshold value a is the motion towards the parent terminal 2, and the display unit 33 and the speaker 34 output an alarm in accordance with the decision result by the motion detection unit 305. Thus, it is possible to prevent the movement of the searcher object towards the searcher from being erroneously suppressed.

In the above, the preferred embodiment of the present invention has been described. However, the present invention is not limited thereto, but can be modified in various ways.

For example, the steps shown in the preferred embodiment are mere examples. The steps are not limited to the order and the contents described above. That is, if the same effect can be obtained, the order or the contents may be modified as appropriate.

The functional blocks shown in the preferred embodiment (e.g., the communication control unit 200, 300, the positioning control unit 201, 304, and the like) are achieved in forms of software by the operation of the CPU 20, 30 in accordance with the program 210, 310. However, a portion or an entire portion of those functional blocks may be formed by a dedicated logic circuit in the form of hardware.

Further, the steps which are shown as being processed sequentially may be configured such that a portion thereof is processed in parallel (simultaneously).

The information creation unit 204 of the parent terminal 2 may be refer to the received child terminal information 313 to create the search information 214 corresponding to the radio wave intensity Fs included in that child terminal information 313, and that search information 214 may be output by the display unit 23 and the speaker 24. The radio wave intensity Fs can be regarded as representing the degree of visibility of the search side. Therefore, it is possible to induce the searcher to a position at which the searcher can visually recognize the search object easily by creating and outputting the condition of the radio wave intensity Fs as the search information 214, so that the search object can be easily found.

In the above preferred embodiment, it is necessary to input the operation start signal while the parent terminal's initial posture and the child terminal's initial posture are made the same. However, the present invention is not limited to this embodiment. For example, for a certain time period from the input of the operation start signal, the searcher (parent terminal 2) can be regarded as acting together with the search object (child terminal 3). Therefore, the acceleration sensors 26 and 36 are started when the operation start signal is input, and the relative positioning is performed in each of the parent terminal 2 and the child terminal 3 for the certain period. Then, the relationship between the parent terminal's initial posture and the child terminal's initial posture may be obtained so that the result of the relative positioning obtained for this time period of the parent terminal 2 and that of the child terminal 3 are coincident with each other (those should be coincident because the terminals 2 and 3 move together). By this configuration, the power consumption increases to some extent, as compared to the above-described preferred embodiment, because the acceleration sensors 26 and 36 are operating until the relationship between the parent terminal's initial posture and the child terminal's initial posture is identified. However, since it is unnecessary to adjust the parent terminal's posture and the child terminal's posture to be the same when the operation start signal is input, the burden on the user is reduced.

Further, in the above preferred embodiment, for both the parent terminal's initial posture and the child terminal's initial posture, the relationship with an absolute azimuth is not determined. However, the relationship between the parent terminal's initial posture and the child terminal's initial posture and the absolute azimuth may be determined. For example, the searcher may input the operation start signal by operating the operation unit 22 while making the posture of the parent terminal 2 have a certain posture (which is predefined, for which the relationship with the absolute azimuth is known, and which is hereinafter referred to as a "parent terminal's defined posture"). For example, a mounting table that regulates the posture of the parent terminal 2 to the parent terminal's defined posture may be provided at the entrance of a shopping mall or the like, and the searcher may input the operation start signal by operating an initialization button (the operation unit 22) while the parent terminal 2 is placed on the mounting table. By doing this action, the parent terminal's initial posture of the parent terminal 2 is stored as the parent terminal's defined posture for which the relationship with the absolute azimuth is known. This operation can be performed for the child terminal 3 in a similar manner.

In place of the gyro sensor 25 and 35, a magnetic sensor that detects the geomagnetism may be provided as the posture identification element, and the positioning control unit 201, 304 may operate the magnetic sensor of its own terminal to start measurement of the angular velocity, in accordance with the decision result by the intensity decision unit 302. By the configuration in which the absolute azimuth is acquired by the magnetic sensor, it is unnecessary to continue to always observe the posture and the power consumption can be suppressed.

In the above-described preferred embodiment, an example is described in which, also in the child terminal 3, the operation unit 32 is operated so that the operation start signal is input. However, when the operation start signal is input, the parent terminal 2 transmits the test signal to the child terminal 3. Therefore, the test signal received by the child terminal 3 for the first time may be regarded as the "operation start signal", so that the activation of the gyro sensor 35 and storing the child terminal's initial posture in the child terminal 3 may be performed. By doing this, the operation can be started without making the search object who is relatively unfamiliar with an operation of a device operate the child terminal 3.

In addition, since both the parent terminal 2 and the child terminal 3 are configured as portable terminal devices, the power consumption should be suppressed. However, as compared with the parent terminal 2 that is carried by the searcher who can easily deal with battery shortage, the power consumption should be further suppressed in the child terminal 3 carried by the search object who hardly deal with such a situation. In the above preferred embodiment, the parent terminal 2 transmits the test signal and the child terminal 3 receives it, thereby the power consumption can be suppressed on the child terminal 3 side on which requirements on the battery life are especially strict. However, the configuration may be employed such that the child terminal 3 transmits the test signal and the parent terminal 2 receives it.

In the above preferred embodiment, it is described that the necessity of search is decided by comparing the difference between the radio wave intensity Fs0 and the radio wave intensity Fs with the threshold value F. However, a ratio of the radio wave intensity Fs0 and the radio wave intensity Fs (an attenuation ratio) may be used. In other words, the intensity decision unit 302 may compare Fs/Fs0 with the threshold value to decide the necessity of the search.

Both the measurement period in the parent terminal 2 and that in the child terminal 3 are described as "Ts" for convenience of the description. However, the measurement period may be different between the parent terminal 2 and the child terminal 3.

The invention claimed is:
1. A lost child search system comprising:
two or more portable terminal devices, each including
 a posture identification element configured to identify a posture of its own device,
 an acceleration sensor configured to measure an acceleration of its own device, and
 a positioning element configured to perform relative positioning of its own device based on the posture identified by the posture identification element and the acceleration measured by the acceleration sensor;
a communication element configured to perform data communication by near-field wireless communication using radio waves between one of the two or more portable terminal devices and another one of the two or more portable terminal devices;
an intensity detection element configured to detect a radio wave intensity in the near-field wireless communication between the one portable terminal device and the other portable terminal device;
a decision element configured to decide, in accordance with the radio wave intensity detected by the intensity detection element, whether or not search for the other portable terminal device performing the near-field wireless communication at the detected radio wave intensity is required;
a relative position calculation element configured to obtain a relative positional relationship between the one portable terminal device and the other portable terminal device based on a positioning result by the positioning element of the one portable terminal device and a positioning result by the positioning element of the other portable terminal device for which it has been decided that the search is necessary by the decision element;
an information creation element configured to create search information based on the positional relationship obtained by the relative position calculation element; and
a search information output element configured to output the search information created by the information creation element, wherein
each of the two or more portable terminal devices further includes a control element configured to make the acceleration sensor of its own device start measuring the acceleration in accordance with the decision result by the decision element.

2. The lost child search system according to claim 1, further comprising
a correction element configured to calculate a correction value for the positional relationship obtained by the relative position calculation element in accordance with the radio wave intensity detected by the intensity detection element, wherein
the information creation element creates the search information based on the correction value obtained by the correction element.

3. The lost child search system according to claim 1, wherein
the decision element decides whether or not the search is necessary by comparing a difference between a radio wave intensity at an initial state and a radio wave intensity at a time of the measurement with a threshold value.

4. The lost child search system according to claim 1, wherein
the posture identification element includes a magnetic sensor configured to detect geomagnetism, and
the control element make the posture identification element of its own device start measuring an angular velocity in accordance with the decision result by the decision element.

5. The lost child search system according to claim 1, wherein
the search information output element outputs the decision result by the decision element.

6. The lost child search system according to claim 1, wherein the other portable terminal device further includes:
a motion detection element configured to detect a motion equal to or larger than a threshold value based on the acceleration measured by the acceleration sensor of its own device, after it is decided that the search for its own device is necessary by the decision element; and
a warning output element configured to output a warning in response to detection of the motion equal to or larger than the threshold value by the motion detection element.

7. The lost child search system according to claim 6, wherein
the motion detection element decides whether or not the detected motion equal to or larger than the threshold value is a motion towards the one of the portable terminal device, and
the warning output element outputs the warning in accordance with the decision result by the motion detection unit.

8. The lost child search system according to claim 1, wherein
the information creation element creates the search information in accordance with the detection result by the intensity detection element.

9. A non-transitory computer-readable storage medium storing computer-readable instructions that, when executed by a computer connected to an external portable terminal device, cause the computer to perform a lost child search method, the method comprising the steps of:
transmitting a test signal via near-field wireless communication using radio waves to the external portable terminal device;
receiving a result of decision whether or not search for the external portable terminal device is necessary in accordance with a radio wave intensity of the test signal, and a result of relative positioning of the external portable terminal device from the external portable terminal device;
identifying a posture of the computer;
measuring an acceleration of the computer by an acceleration sensor in accordance with the received decision result;
performing relative positioning of the computer in accordance with the identified posture of the computer and the acceleration of the computer measured by the acceleration sensor;
obtaining a relative positional relationship between the computer and the external portable terminal device based on the result of the relative positioning of the computer and the received result of the relative positioning of the external portable terminal device;
creating search information based on the obtained positional relationship; and
outputting the created search information.

10. A non-transitory computer-readable storage medium storing computer-readable instructions that, when executed by a computer connected to an external portable terminal device, cause the computer to perform a lost child search method, the method comprising the steps of:
receiving a test signal transmitted from the external portable terminal device via near-field wireless communication using radio waves;
detecting a radio wave intensity when the test signal has been received;
deciding whether or not search for the computer is necessary in accordance with the detected radio wave intensity;
identifying a posture of the computer;
measuring an acceleration of the computer by an acceleration sensor in accordance with the decision result;
performing relative positioning of the computer in accordance with the identified posture of the computer and the acceleration of the computer measured by the acceleration sensor; and
transmitting a result of the relative positioning to the external portable terminal device.

11. A lost child search method comprising the steps of:
transmitting a test signal via near-field wireless communication using radio waves from one portable terminal device to another portable terminal device different from the one portable terminal device;
detecting a radio wave intensity when the test signal has been received in the other portable terminal device;
deciding whether or not search for the other portable terminal device is necessary in accordance with the detected radio wave intensity;
identifying a posture of the one portable terminal device;
identifying a posture of the other portable terminal device;

measuring an acceleration of the one portable terminal device after the search for the other portable terminal device is decided as being necessary;

measuring an acceleration of the other portable terminal device after the search for the other portable terminal device is decided as being necessary;

obtaining a relative position of the one portable terminal device in accordance with the identified posture of the one portable terminal device and the measured acceleration of the one portable terminal device;

obtaining a relative position of the other portable terminal device in accordance with the identified posture of the other portable terminal device and the measured acceleration of the other portable terminal device;

obtaining a relative positional relationship between the one portable terminal device and the other portable terminal device in accordance with the relative position of the one portable terminal device and the relative position of the other portable terminal device;

creating search information based on the relative positional relationship; and outputting the created search information.

* * * * *